US010096237B2

(12) United States Patent
Lee et al.

(10) Patent No.: US 10,096,237 B2
(45) **Date of Patent: *Oct. 9, 2018**

(54) ELECTRONIC APPARATUS, EXTERNAL APPARATUS, AND METHOD OF CONTROLLING POWER SUPPLY TO EXTERNAL APPARATUS

(71) Applicant: SAMSUNG ELECTRONICS CO., LTD., Suwon-si (KR)

(72) Inventors: Seung-bok Lee, Hwaseong-si (KR); Geun-sam Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,743

(22) Filed: Mar. 21, 2017

(65) Prior Publication Data

US 2017/0193815 A1 Jul. 6, 2017

Related U.S. Application Data

(63) Continuation of application No. 14/739,604, filed on Jun. 15, 2015, now Pat. No. 9,640,065.

(30) Foreign Application Priority Data

Jul. 16, 2014 (KR) ........................ 10-2014-0089754

(51) Int. Cl.
*G05B 11/01* (2006.01)
*G08C 19/16* (2006.01)
(Continued)

(52) U.S. Cl.
CPC ......... *G08C 17/02* (2013.01); *G08C 2201/12* (2013.01)

(58) Field of Classification Search
CPC .... G08C 17/02; G08C 2201/40; G08C 19/28; G08C 2201/92; G08C 2201/21;
(Continued)

(56) References Cited

U.S. PATENT DOCUMENTS 8,578,429 B2 11/2013 Lim et al.
8,606,183 B2 12/2013 Kim
(Continued)

FOREIGN PATENT DOCUMENTS

CN 101213582 A 7/2008
CN 101394524 A 3/2009
(Continued)

OTHER PUBLICATIONS

Communication dated Dec. 15, 2015, issued by the European Patent Office in counterpart European Patent Application No. 15175751.5.
(Continued)

*Primary Examiner* — Emily C Terrell
(74) *Attorney, Agent, or Firm* — Sughrue Mion, PLLC

(57) ABSTRACT

An electronic apparatus, an external apparatus, and a method of controlling a power supply to the external apparatus are provided. The electronic apparatus includes a transceiver configured to wirelessly connect to an external apparatus, a processor configured to control the transceiver to transmit a control packet for turning off the external apparatus to the external apparatus in response to an input corresponding to a power off command of the electronic apparatus being received. The control packet may be generated according to a profile of a short range communication.

19 Claims, 15 Drawing Sheets

(51) Int. Cl.
*G08C 19/12* (2006.01)
*G08C 19/02* (2006.01)
*G08C 17/02* (2006.01)

(58) Field of Classification Search
CPC ............ G08C 2201/93; G08C 2201/20; G08C 23/04; G08C 2201/30; G08C 19/00; G08C 2201/12; G08C 2201/50; G08C 2201/60; G08C 2201/70; G08C 2201/91; H04L 12/2803; H04L 12/282; H04L 2012/285; H04L 67/12; H04L 69/26; H04L 12/2814; H04L 12/2807; H04L 12/281; H04L 12/2818; H04L 12/2823; H04L 12/2825; H04L 12/2827; H04L 12/2832; H04L 63/105; H04N 21/42225; H04N 21/42226; H04N 2005/4435; H04N 21/4108; H04N 21/42207; H04N 21/4222; H04N 21/4363; H04N 21/6582; H04N 21/8186; H04N 5/4403; H04B 5/02
See application file for complete search history.

(56) References Cited

U.S. PATENT DOCUMENTS

| | | | | |
|---|---|---|---|---|
| 8,881,206 | B2 | 11/2014 | Lim et al. | |
| 8,881,207 | B2 | 11/2014 | Lim et al. | |
| 9,406,219 | B2 | 8/2016 | James et al. | |
| 2004/0123315 | A1 | 6/2004 | Na | |
| 2005/0186988 | A1 | 8/2005 | Lim et al. | |
| 2005/0195099 | A1* | 9/2005 | Vidal | G08C 17/02 341/176 |
| 2005/0197093 | A1 | 9/2005 | Wiklof et al. | |
| 2006/0066757 | A1 | 3/2006 | Numata et al. | |
| 2007/0141981 | A1 | 6/2007 | Choi | |
| 2007/0249383 | A1 | 10/2007 | Wiklof et al. | |
| 2009/0015433 | A1 | 1/2009 | James et al. | |
| 2009/0098880 | A1* | 4/2009 | Lindquist | G01S 19/34 455/456.1 |
| 2009/0299541 | A1 | 12/2009 | Park et al. | |
| 2011/0117851 | A1 | 5/2011 | Kim | |
| 2011/0197085 | A1 | 8/2011 | Wu | |
| 2012/0028568 | A1 | 2/2012 | Lim et al. | |
| 2012/0028569 | A1 | 2/2012 | Lim et al. | |
| 2012/0030719 | A1 | 2/2012 | Lim et al. | |
| 2012/0030720 | A1 | 2/2012 | Lim et al. | |
| 2013/0035941 | A1 | 2/2013 | Kim et al. | |
| 2013/0318265 | A1 | 11/2013 | Lee et al. | |
| 2014/0095585 | A1 | 4/2014 | Clift | |
| 2014/0159879 | A1 | 6/2014 | Rezvani et al. | |
| 2015/0058886 | A1 | 2/2015 | Lim et al. | |
| 2015/0271542 | A1 | 9/2015 | Lim et al. | |
| 2015/0296073 | A1 | 10/2015 | Lo et al. | |
| 2017/0046946 | A1 | 2/2017 | James et al. | |

FOREIGN PATENT DOCUMENTS

| | | | |
|---|---|---|---|
| CN | 102064857 | A | 5/2011 |
| CN | 103814579 | A | 5/2014 |
| CN | 103885352 | A | 6/2014 |
| KR | 10-2005-0083086 | A | 8/2005 |
| KR | 10-2007-0064180 | A | 6/2007 |
| KR | 10-2013-0016025 | A | 2/2013 |
| KR | 10-2013-0122349 | A | 11/2013 |
| WO | 2013/027941 | A1 | 2/2013 |

OTHER PUBLICATIONS

Communication dated Aug. 6, 2015 by the Korean Intellectual Property Office in related Application No. 10-2014-0089754.

Communication dated Dec. 20, 2017 by the State Intellectual Property Office of P.R. China in counterpart Chinese Patent Application No. 201510418676.7.

Communication dated Jul. 3, 2018, issued by the State Intellectual Property Office of the People's Republic of China in counterpart Chinese Application No. 201510418676.7.

Communication dated Jul. 31, 2018, issued by the State Intellectual Property Office of the People's Republic of China in counterpart Chinese Application No. 201610586706.X.

* cited by examiner

ELECTRONIC APPARATUS, EXTERNAL APPARATUS, AND METHOD OF CONTROLLING POWER SUPPLY TO EXTERNAL APPARATUS

CROSS-REFERENCE TO RELATED APPLICATION(S)

This is a continuation of U.S. application Ser. No. 14/739,604, filed Jun. 15, 2015, which claims priority under 35 U.S.C. § 119 from Korean Patent Application No. 10-2014-0089754, filed on Jul. 16, 2014, in the Korean Intellectual Property Office, the disclosure of which is incorporated herein by reference in its entirety.

BACKGROUND

1. Field

Exemplary embodiments relate to providing an electronic apparatus, an external apparatus, and a method of controlling a power supply to the external apparatus, and more particularly, to providing a method of controlling an external apparatus to be turned on and/or off through an electronic apparatus that is wirelessly connected to the external apparatus.

2. Description of the Related Art

Bluetooth that uses an IEEE 802.15.1 standard refers to an industrial standard of Personal Area Networks (PANs). Bluetooth uses an Industrial Scientific Medical (ISM) band of 2.4 GHz to consume a small amount of power and configure a system at a low cost.

A display apparatus (e.g., a source apparatus) may be connected to a sound bar (e.g., a sink apparatus) through Bluetooth to stream audio. If the display apparatus is turned off by a user, the sound bar may maintain a power on state. The user may then turn off the sound bar like the display apparatus. The sound bar may request information from the display apparatus or may request a connection to the display apparatus. If the display apparatus is turned on by the user, the user may turn on the sound bar as well.

SUMMARY

Exemplary embodiments address at least the above problems and/or disadvantages and other disadvantages not described above. However, the exemplary embodiments are not required to overcome the disadvantages described above, and an exemplary embodiment may not overcome any of the problems described above.

According to an aspect of an exemplary embodiment, there is provided an electronic apparatus including: a transceiver configured to wirelessly connect to an external apparatus; a processor configured to control the transceiver to transmit a control packet for turning off the external apparatus to the external apparatus in response to an input corresponding to a power off command of the electronic apparatus being received. The control packet may be generated according to a profile of a short range communication.

The profile may include an Audio Video Remote Control Profile (AVRCP).

According to an aspect of another exemplary embodiment, there is provided a method of controlling an electronic apparatus, the method including: receiving a first user input for turning off the electronic apparatus, the first user input being received through the electronic apparatus that is wirelessly connected to an external apparatus; transmitting a control packet for turning off the external apparatus to the external apparatus in response to the first user input; and turning off the electronic apparatus. The control packet may be generated according to a Bluetooth profile.

According to an aspect of another exemplary embodiment, there is provided an audio apparatus including: a transceiver configured to wirelessly connect to a display apparatus; and a processor configured to control to turn off the audio apparatus in response to the transceiver to receiving a control packet for turning off the audio apparatus. The control packet may be generated according to a Bluetooth profile.

According to an aspect of another exemplary embodiment, there is provided a method of controlling a power supply to an audio apparatus that is wirelessly connected to a display apparatus, the method including: receiving a control packet for turning off the audio apparatus from the display apparatus in response to a user input to turn off the display apparatus, the user input being input from the display apparatus; and turning off the audio apparatus in response to the received control packet. The control packet may be is generated according to.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
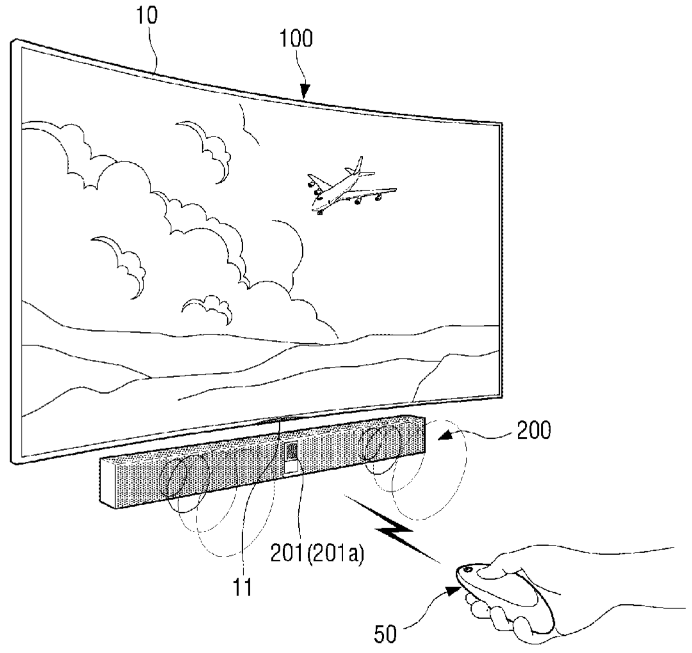
FIG. 1 is a schematic view illustrating an operation between a display apparatus and an audio apparatus according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Well-known functions or constructions are not described in detail since they would obscure the exemplary embodiments with unnecessary detail.

Although the terms, 'first', 'second', etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

"Selection of Key" positioned in a remote control may be used as a term meaning pressing or touching of a key. For example, a mechanical button or a soft touch switch may be selected.

The powering off of a display apparatus may occur when a power plug and a power source (e.g., a socket) are connected to each other. If the display apparatus, the power plug of which is connected to the power source, is turned off, a power may be supplied to the display apparatus (e.g., the display apparatus may be turned on) through a power key (or a power button) of the remote controller.

A power off of an audio apparatus may mean that a power plug of the audio apparatus is connected to a power source (e.g., a socket).

A content may include a video, an image, a text, or a web document.

The terminology used herein is for the purpose of describing particular exemplary embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

FIG. 1 is a schematic view illustrating an operation between a remote control 50, a display apparatus 100, and an audio apparatus 200 according to an exemplary embodiment.

Referring to FIG. 1, the audio apparatus 200 is wirelessly connected to the remote control 50 and the display apparatus 100. The display apparatus 100 may be connected to the audio apparatus 200 by wire.

The remote control 50 may control the display apparatus 100 and/or the audio apparatus 200 by using a short range communication including infrared communication or Bluetooth communication. A user may control functions of the display apparatus 100 and/or the audio apparatus 200 through the remote control 50 by using at least one selected from a key (including a button) of the remote control 50, a touch pad, a microphone (not shown) for receiving a user voice, and a sensor (not shown) for recognizing a motion of the remote control 50. If a power is supplied to the display apparatus 200 under control of the remote control 50, the display apparatus 100 may turn on an indicator 11 positioned on a front surface of a bezel 10. The indicator 11 that is turned on emits light from in the bezel 10.

If a power is supplied to the audio apparatus 200, the audio apparatus 200 may supply a power to a light source (not shown) thereof to enable light to shine or to be emitted through a display window 201. If the power is supplied to the audio apparatus 200, the audio apparatus 200 may output an audio that is wirelessly received. If the power is supplied to the audio apparatus 200, the audio apparatus 200 may supply a power to an indicator 201*a*.

Figure 9:
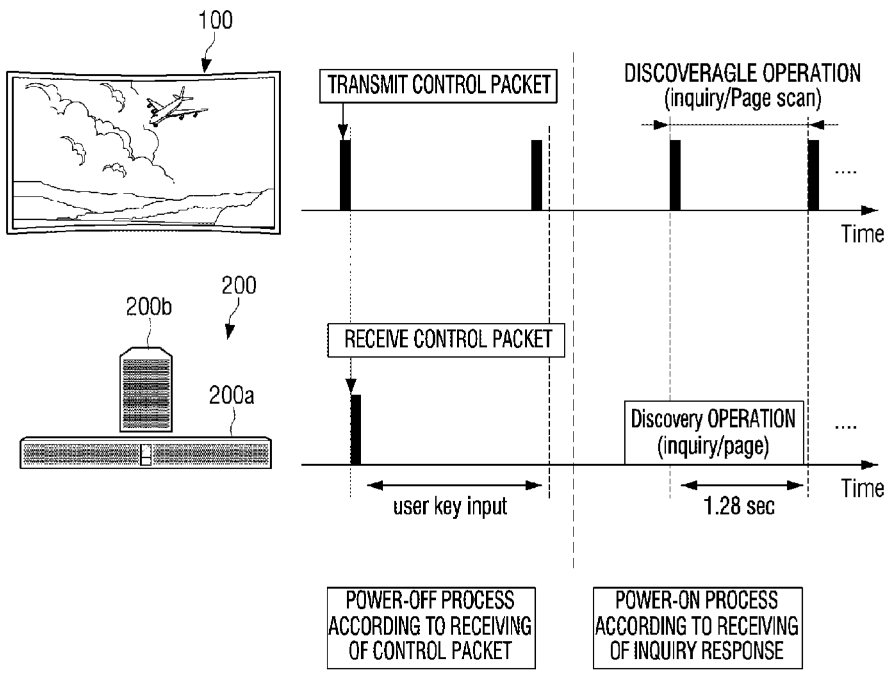
FIG. 9 is a view illustrating discoveries of a display apparatus and an audio apparatus according to an exemplary embodiment.

Referring to FIG. 9, the audio apparatus 200 may include a sound bar 200*a* and a woofer 200*b* that is connected to the sound bar 200*a*. The audio apparatus 200 may also further include an additional speaker (not shown) besides the sound bar 200*a* and the woofer 200*b*.

The remote control 50 may turn on and/or off the display apparatus 100, control a volume of the display apparatus 100, select terrestrial broadcasting, cable broadcasting and/or satellite broadcasting of the display apparatus 100, or set an environment of the display apparatus 100 according to an input of the user. The user may turn on and/or off the audio apparatus 200, control a volume of the audio apparatus 200, or select a source of the audio apparatus 200 by using the remote control 50 or another remote control (not shown).

Figure 2:
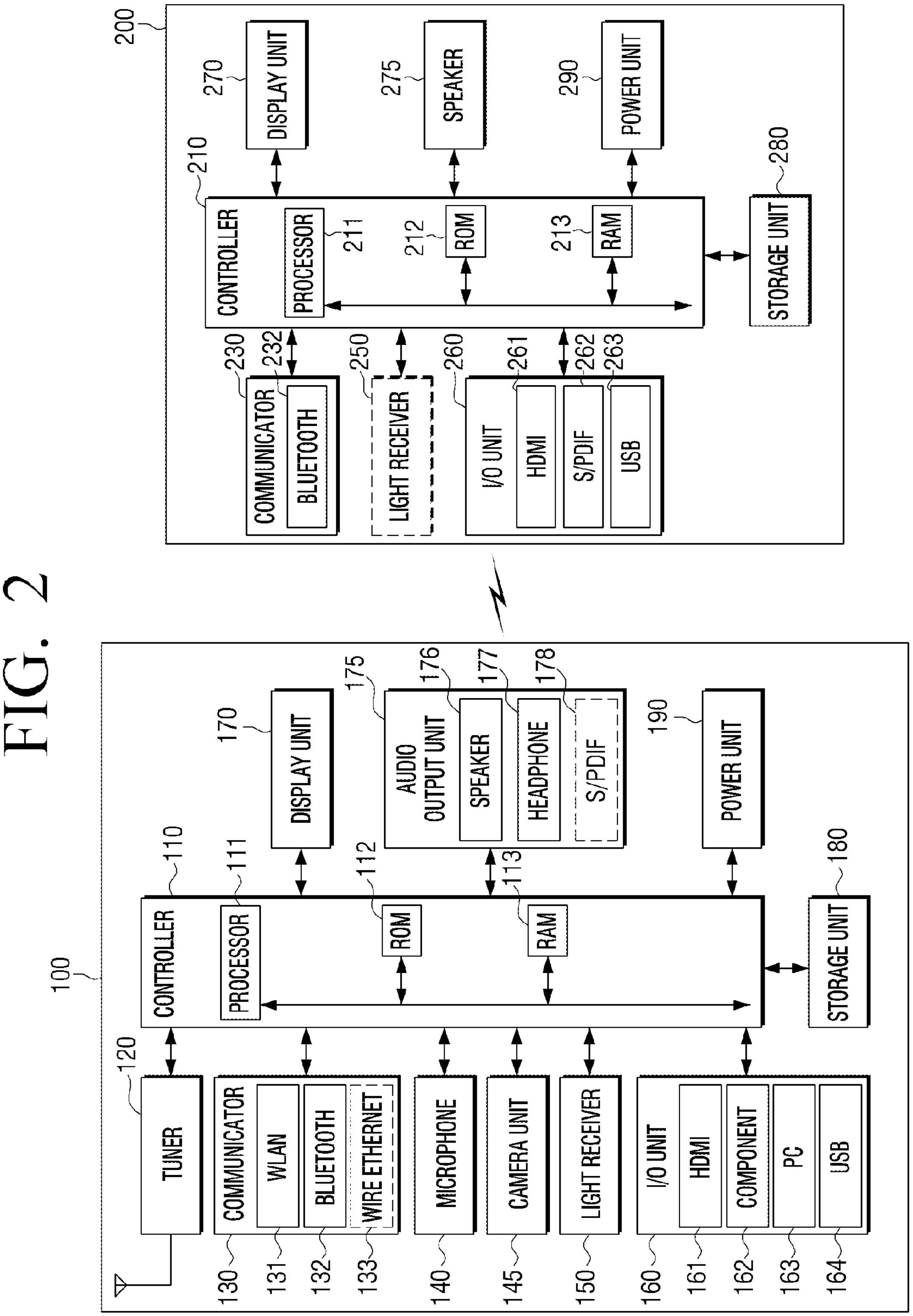
FIG. 2 is a block diagram illustrating a display apparatus and an audio apparatus according to an exemplary embodiment.

The user may use the remote control 50 to output an audio of the audio, a video, and/or additional information, which are received from a broadcast channel selected in the display apparatus 100, through an internal speaker (not shown) of the display apparatus 100 or a speaker 275 of the audio apparatus 200 of FIG. 2 that is connected to the display apparatus 100 by wire and/or wireless.

The display apparatus 100 may be implemented as a flat display apparatus, a curved display apparatus having a screen with a curvature, or a flexible display apparatus having a controllable curvature. The display apparatus 100 may also be implemented as various types of apparatuses that have screens and may be connected to the audio apparatus 200 through a local area network (LAN).

An output resolution of the display apparatus 100 may, for example, include a high definition (HD), a full HD, or a definition that is greater than ultra HD. A diagonal length of a screen of the display apparatus 100 may be, for example, 650 mm or less, 660 mm, 800 mm, 1,010 mm, 1,520 mm, 1,890 mm, or 2,000 mm or more. A horizontal length and/or a vertical length of the screen of the display apparatus 100 (or a horizontal length and/or a vertical length of the display apparatus 100) may, for example, be 643.4 mm×396.5 mm, 934.0 mm×548.6 mm, 1,670.2 mm×962.7 mm, 2,004.3 mm×1,635.9 mm, or the like. Alternatively, a ratio between the horizontal length and/or the vertical length of the screen of the display apparatus 100 may, for example, be 4:3, 16:9, 16:10, 21:9, or 21:10.

A speaker 177 of the display apparatus 100 may be implemented as 2 channels, 2.1 channels, 4 channels, 4.1 channels, 5.1 channels, 6.1 channels, 7.1 channels, 9.1 channels, or 11.2 channels but is not limited thereto.

The term "user" used herein may refer to a person who controls a function or an operation of the display apparatus 100 by using the remote control 50 or other input device that is wired to the display apparatus or wirelessly connected to the display apparatus and may be referred to as a user, a manager, or an installation engineer.

FIG. 2 is a block diagram illustrating a display apparatus 100 and an audio apparatus 200 according to an exemplary embodiment.

Referring to FIG. 2, the display apparatus 100 receives a control signal from the remote control 50 and may be connected to an external apparatus (e.g., including the audio apparatus 200) by wire or wireless by using a communicator 130 or an input/output (I/O) unit 160. The display apparatus 100 may be referred to as an electronic apparatus or a source apparatus that wirelessly controls the external apparatus.

The external apparatus refers to an apparatus that may be connected to the display apparatus 100 by wireless (e.g., through a Bluetooth communication, a short range communication, or the like) or an apparatus that is wirelessly connected to the display apparatus 100 and includes a speaker. For example, examples of the external apparatus may include a home theater (not shown), a wireless sound bar (not shown), a portable phone (not shown), a smartphone (not shown), a desktop PC (not shown), a notebook PC (not shown), a tablet PC, etc. The external apparatus may be referred to as a sink apparatus that is wirelessly controlled by the source apparatus.

Exemplary embodiments may be applied between the audio apparatus 200 wirelessly connected to the display apparatus 100 and an external apparatus (not shown) wirelessly connected to the external apparatus.

The display apparatus 100 may include a display unit 170 (e.g., a display, etc.), a tuner 120, the communicator 130 (e.g., a transceiver, etc.), and the I/O unit 160 (e.g., an input/output device or module, etc.). The display apparatus 100 may include combinations of the display unit 170, the tuner 120, the communicator 130, and the I/O unit 160. The display apparatus 100 including the display unit 170 may be electrically connected to an additional external apparatus (e.g., a set-top box (not shown)) including a tuner. For example, the display apparatus 100 may be implemented as an analog TV, a digital TV, a 3D TV, a smart TV, a light-emitting diode (LED) TV, an organic LED (OLED) TV, a plasma TV, a monitor, or the like but is not limited thereto.

The display apparatus 100 includes the tuner 120, the communicator 130, a microphone 140, a camera unit 145 (e.g., a camera, etc.), a light receiver 150, the I/O unit 160, the display unit 170, an audio output unit 175 (e.g., an audio output, etc.), a storage unit 180 (e.g., a storage, etc.), and a power unit 190 (e.g., a power supply, etc.). The display apparatus 100 may include a sensor (not shown) (e.g., an illumination sensor, a temperature sensor, or the like) that detects an internal or external status of the display apparatus 100.

A controller 110 may include a processor 111, a read only memory (ROM) 112 that stores a control program for controlling the display apparatus 100, and a random access memory (RAM) 113 that stores a signal or data input from an outside of the display apparatus 100 or that is used as a storage area corresponding to various types of jobs performed by the display apparatus 100.

The controller 110 controls an overall operation of the display apparatus 100 and a signal flow between the internal elements 120 through 190 of the display apparatus 100, and processes data. The controller 110 controls a power source that is supplied from the power unit 190 to the internal elements 120 through 180. If there is an input of a user or a preset and stored condition is satisfied, the controller 110 may execute an operating system (OS) and various types of applications.

The processor 111 may include a graphic processing unit (GPU) (not shown) that processes a graphic corresponding to a picture or an image. The processor 111 may be implemented as a System on Chip (SoC) into which a core (not shown) and the GPU are integrated. The processor 111 may include a single core, a dual core, a triple core, a quad core, and a multiple core.

The processor 111 may also include a plurality of processors. For example, the processor 111 may be implemented as a main processor (not shown) and a sub processor (not shown) that operates in a sleep mode. The processor 111, the ROM 112, and the RAM 113 may be connected to one another through an internal bus.

The term "processor of display apparatus" used herein includes the processor 111, the ROM 112, and the RAM 113.

The controller 110 may control the communicator 130, which is wirelessly connected to the external apparatus, to transmit a control packet corresponding to a power off of the external apparatus in response the power off of the external apparatus.

The controller 110 may control to receive a user input corresponding to a power off of the electronic apparatus through at least one selected from the light receiver 150 that receives light from the remote control 50, a panel key (not shown) that is positioned on one of a side and a back surface of the electronic apparatus, the microphone 140 that receives a user voice, and the camera unit 145 that receives a user motion. The user input may be written as various types of terms such as a user manipulation, a user command, an input command, etc.

If the control packet is transmitted to the external apparatus, the controller 110 may control an indicator, which is turned on and/or off in response to power on and/or off of the electronic apparatus, to be turned off in response to the power off of the electronic apparatus.

The controller 110 may control to receive a user input, which is to turn on the electronic apparatus, through at least one selected from the light receiver 150, the panel key, the microphone 140, and the camera unit 145.

The controller 110 may control to change the electronic apparatus, which is turned on, into a discoverable mode and transmit an inquiry response to the external apparatus in response to an inquiry received from the external apparatus.

If the external apparatus is turned on, the controller 110 may control to stream an audio to the external apparatus that is reconnected to the electronic apparatus.

A structure and an operation of the controller 110 may be variously implemented according to exemplary embodiments.

The tuner 120 may amplify, mix, and resonate a broadcasting signal received by wire or wireless to tune and select only a frequency of a channel that the display apparatus 100 is to receive among electric wave components. The broadcasting signal includes an audio, a video, and additional information (e.g., an electronic program guide (EPG)).

The tuner 120 may receive the broadcasting signal in a frequency band corresponding to a channel number (e.g., number 506 on a cable TV) according to a user input (e.g., a control signal, a channel number input, and a channel up-down input received from the remote control 50, and a channel input on an EPG screen).

The tuner 120 may receive the broadcasting signal from various types of sources such as terrestrial broadcasting, cable broadcasting, satellite broadcasting, Internet broadcasting, etc. The tuner 120 may receive the broadcasting signal from a source such as analog broadcasting, digital broadcasting, or the like. The broadcasting signal received through the tuner 120 is decoded (e.g., audio-decoded, video-decoded, or additional information-decoded) to be divided into an audio, a video, and/or additional information. The divided audio, video, and/or additional information may be stored in the storage unit 180 under control of the controller 110.

The display apparatus 100 may include one tuner 120 or a plurality of tuners 120.

The tuner 120 may be implemented as an all-in-one type with the display apparatus 100 or may be implemented as an additional apparatus (e.g., a set-top box (not shown)) having a tuner that is electrically connected to the display apparatus 100 or a tuner (not shown) that is connected to the I/O unit 160.

The communicator 130 may connect the display apparatus 100 to the external apparatus (e.g., an audio apparatus) under control of the controller 110. The controller 110 may transmit and/or receive a content from and/or to the external apparatus connected through the communicator 130, download an application from the external apparatus, or browse a web. The communicator 130 may include one selected from a wireless LAN (WLAN) 131, Bluetooth 132, and wire Ethernet 133. The communicator 130 may also include combinations of the WLAN 131, the Bluetooth 132, and the wire Ethernet 133. The communicator 130 may receive a remote control signal (including a control signal) of the remote control 50 under control of the controller 110. The remote control signal may be implemented as a Bluetooth type or a radio frequency (RF) signal type.

The communicator 130 may further include another short range communication (e.g., a near field communication (NFC) (not shown)) and Bluetooth low energy (BLE) (not shown).

The microphone 140 receives a voice uttered by the user. The microphone 140 may convert the received voice into an electric signal and output the electric signal to the controller 110. For example, the user voice may include a voice corresponding to a menu or a function of the display apparatus 100. A recognition range of the microphone 140 may be recommended within 4 m from the microphone 140 to a position of the user and may change in response to sizes of the user voice and a surrounding environment (e.g., a speaker sound, peripheral noise, or the like).

The microphone 140 may be implemented as an all-in-one type or a separate type along with the display apparatus 100. The microphone 140 that separates from the display apparatus 100 may be electrically connected to the display apparatus 100 through the communicator 130 or the I/O unit 160.

The microphone 140 may be removed according to a performance and a structure of the display apparatus 100.

The camera unit 145 receives an image (e.g., consecutive frames) corresponding to a motion of the user including a gesture in a camera recognition range. For example, a recognition range of the camera unit 145 may be a distance between 0.1 m and 5 m from the camera unit 145 to the user. The motion of the user may, for example, include a part of a body of the user, such as a face, an expression, a hand, a fist, or a finger, or a motion of a part of the user. The camera unit 145 may convert the received image into an electric signal and output the electric signal to the controller 10 under control of the controller 110.

The controller 110 may select a menu displayed on the display apparatus 100 or perform a control corresponding to a recognition result of the received motion of the user by using the recognition result of the motion of the user. For example, a channel control, a volume control, and an indicator movement may be included.

The camera unit 145 may include a lens (not shown) and an image sensor (not shown). The camera unit 145 may support an optical zoom or a digital zoom by using a plurality of lenses and image processing. The recognition range of the camera unit 145 may be variously set according to an angle and a peripheral environment condition of a camera. If there are a plurality of camera units 145, the camera units 145 may receive a 3D still image or a 3D motion by using a second camera (not shown) (e.g., having a distance longer than 2 cm and shorter than 8 cm from a first camera) adjacent to the first camera of the bezel 10.

The camera unit 145 may be implemented as an all-in-one type or a separate type with the display apparatus 100. An additional apparatus (not shown) including the separated camera unit 145 may be electrically connected to the display apparatus 100 through the communicator 130 or the I/O unit 160.

The camera unit 145 may be removed according to the performance and the structure of the display apparatus 100.

The light receiver 150 receives a light signal (including a control signal) from the remote control 50 through a light window (not shown) of the bezel 10. The light receiver 150 may receive the light signal corresponding to a user input (e.g., a touch, a press, a touch gesture, a voice, or a motion) from the remote control 50. A control signal may be extracted from the received light signal under control of the controller 110.

The I/O unit 160 receives a video (e.g., a moving picture or the like), an audio (e.g., a voice, music, or the like), additional information (e.g., an EPG or the like), etc. from an outside of the display apparatus 100 under control of the controller 110. The I/O unit 160 may include one selected from a high definition multimedia interface (HDMI) port 161, a component jack 162, a PC port 163, and a universal serial bus (USB) port 164. The I/O unit 160 may include combinations of the HDMI port 161, the component jack 162, the PC port 163, and the USB port 164.

A structure and an operation of the I/O unit 160 may be variously implemented according to exemplary embodiments.

The display unit 170 displays the video, which is included in the broadcasting signal received through the tuner 120, on a screen under control of the controller 110. The display unit 170 may display a content (e.g., a moving picture) that is input through the communicator 130 or the I/O unit 160. The display unit 170 may output the image stored in the storage unit 180 under control of the controller 110. The display unit 170 may also display a voice user interface (UI) (e.g., including a voice command guide) for performing a voice recognition task corresponding to a voice recognition or a motion UI (e.g., including a user motion guide for a motion recognition) for performing a motion recognition task corresponding to a motion recognition.

The display apparatus 170 according to an exemplary embodiment may output a visual feedback corresponding to power and/or on of the display apparatus 100 under control of the controller 110.

The audio output unit 175 outputs the audio, which is included in the broadcasting signal received through the tuner 120, under control of the controller 110. The audio output 175 may output an audio (e.g., a voice, a sound, or the like) that is input through the communicator 130 or the I/O unit 160. The audio output unit 175 may also output an audio stored in the storage unit 180 under control of the controller 110. The audio output unit 175 may include at least one selected from a speaker 176, a headphone output terminal 177, and a Sony/Philips Digital Interface (S/PDIF) output terminal 178. The audio output unit 175 may include combinations of the speaker 176, the headphone output terminal 177, and the S/PDIF output terminal 178.

The audio output unit 175 according to an exemplary embodiment may output an auditory feedback corresponding to the power off and/or on of the display apparatus 100 under control of the controller 110 of the display apparatus 100.

The storage unit 180 may store various types of data, programs, or applications for driving and controlling the display apparatus 100 under control of the controller 110. The storage unit 180 may store input and/or output signals or data corresponding to driving of the tuner 120, the communicator 130, the microphone 140, the camera unit 145, the light receiver 150, the I/O unit 160, the display unit 170, the audio output unit 175, and the power unit 190. The storage unit 180 may store a control program that is to control the display apparatus 100 and the controller 110, an application that is initially provided by a manufacturer or is downloaded from an external source, a graphical user interface (GUI) that is related to the application, an object (e.g., an image text, an icon, a button, or the like) that is to provide the GUI, user information, a document, databases (DBs), or pieces of related data.

The term "storage" used herein includes the storage unit 180, the ROM 112 or the RAM 113 of the controller 110, or a memory card (e.g., a micro secure digital (SD) card, a USB memory, or the like (not shown)) installed in the display apparatus 100. The storage unit 180 may also include a nonvolatile memory, a volatile memory, a hard disc drive (HDD), or a solid state drive (SSD).

The storage unit 180 may include a broadcasting reception module (not shown), a channel control module, a volume control module, a communication control module, a voice recognition module, a motion recognition module, a light reception module, a display control module, an audio control module, an external input control module, a power control module, a power control module of an external apparatus that is connected by wireless (e.g., through Bluetooth), a voice DB, or a motion DB. Modules (not shown) and a DB (not shown) of the storage unit 180 may be implemented as pieces of software to perform a broadcasting reception control function, a channel control function, a volume control function, a communication control function, a voice recognition function, a motion recognition function, a light reception control function, a display control function, an audio control function, an external input control function, or a power control function of the display apparatus 100, or a power control function of the external apparatus that is connected by wireless (e.g., through Bluetooth). The controller 110 may perform functions as mentioned above by using these pieces of software stored in the storage unit 180.

The storage unit 180 may store a profile of the display apparatus 100 corresponding to power on and/or off of the audio apparatus 200

The storage unit 180 may store a profile of the display apparatus 100 corresponding to audio streaming performed with respect to the audio apparatus 200.

The storage unit 180 may store a user input (e.g., corresponding to power off and/or on) that is received through one selected from the light receiver 150, the panel key (not shown), the microphone 140, and the camera 145.

The storage unit 180 may store information about whether the discoverable mode of the display apparatus 100 is changed.

The storage unit 180 may store information about whether a control command of the display apparatus 100 is transmitted and a transmission time of the control command.

The storage unit 180 may store a wireless connection history (e.g., apparatus information of each of the display apparatus 100 and the audio apparatus 200, and access numbers, access dates, access times, etc. of the display apparatus 100 and the audio apparatus 200) between the display apparatus 100 and the audio apparatus 200.

The storage unit 180 may store an image, a symbol, and/or a text that may be displayed on the display unit 170.

The storage unit 180 may store a moving picture or an image corresponding to a visual feedback.

The storage unit 180 may store a sound corresponding to an auditory feedback.

The power unit 190 supplies power, which is input from an external power supply source, to the internal elements 120 through 180 of the display apparatus 100 under control of the controller 110. The power unit 190 may supply power, which is output from one battery (not shown) or two or more batteries (not shown) positioned inside the display apparatus 100, to the internal elements 120 through 180.

The elements 120 through 190 of the display apparatus 100 shown in FIGS. 1 and 2 may be removed or at least one element may be added in response to the performance of the display apparatus 100. Positions of the elements 120 through 190 may be changed according to the performance or the structure of the display apparatus 100.

Referring to FIG. 2, the audio apparatus 200 is connected to the display apparatus 100 through a communicator 230 (e.g., a transceiver, etc.) by wireless (e.g., through Bluetooth 232). The audio apparatus 200 may output an audio that is received from the display apparatus 100. The audio apparatus 200 may output audio streaming that is received from the display apparatus 100 wirelessly connected to the audio apparatus 200.

The audio apparatus 200 is connected to an external apparatus (not shown) through the communicator 230 by wireless (e.g., through the Bluetooth 232). The audio apparatus 200 may output the audio that is received from the display apparatus 100 wirelessly connected to the audio apparatus 200.

The audio apparatus 200 may include a controller 210, the communicator 230, a light receiver 250, an I/O unit 260, a display unit 270 (e.g., display, etc.), the speaker 275, a storage unit 280 (e.g., a storage, etc.), and a power unit 290 (e.g., a power supply, etc.).

The controller 210 includes a processor 211. The controller 210 may include the processor 211 and an ROM 212 that stores a control program for controlling the audio apparatus 200. The controller 210 may also include the processor 211, the ROM 212, and an RAM 213 that stores a signal or data input from an outside of the audio apparatus 200 and is used as a storage area corresponding to various types of jobs performed by the audio apparatus 200. The controller 210 may include an audio codec (not shown).

The controller 210 controls an overall operation of the audio apparatus 200 and a signal flow between the internal elements 230 through 280 of the audio apparatus 200, and processes data. The controller 210 controls power that is supplied from the power unit 290 to the internal elements 230 through 280.

The controller 210 may output the received audio through the speaker 275. The controller 210 may output the received audio through an additional speaker (not shown) that is connected through the communicator 230 or the I/O unit 260.

The controller 210 may control the communicator 230 that is wirelessly connected to an electronic apparatus and control the external apparatus to be turned off in response to a control packet corresponding to power off of the electronic apparatus received through the communicator 230.

The controller 210 may control one of an indicator and an illumination source to be turned off after the electronic apparatus is turned off.

The controller 210 may control the electronic apparatus to perform one of an inquiry and a connection request by using the communicator 230.

If a response to one of the inquiry and the connection request is received from the electronic apparatus, the controller 210 may control the external apparatus to be turned off.

If the electronic apparatus and the external apparatus are turned on, the controller 210 may control the speaker 275 to output an audio received from the electronic apparatus that is reconnected.

A structure and an operation of the controller 210 may be variously implemented according to exemplary embodiments.

The communicator 230 may be wirelessly connected to the display apparatus 100 under control of the controller 210. The communicator 230 include the Bluetooth 232 and may also further include another short range communication (e.g., an NFC (not shown)) and BLE (not shown). The communicator 230 may receive a remote control signal (including a control signal) under control of the controller 210. The remote control signal may be implemented as a Bluetooth type or an RF signal type.

The controller 210 may receive various types of audios from the external apparatus that is connected through the communicator 230. The controller 210 may also be wirelessly connected to the external apparatus through the communicator 230.

The light receiver 250 receives a light signal (including a control signal) from the remote control 50 through a light window (not shown). The light receiver 250 may receive the light signal corresponding to a user input (e.g., a touch, a press, a touch gesture, a voice, or a motion) from the remote control 50. The received light signal may be converted and then transmitted to the controller 210. The control signal may be extracted from the light signal received by the controller 210.

The I/O unit 260 may receive an audio (e.g., a sound, music, or the like) from the external apparatus under control of the controller 210. The I/O unit 260 may also output an audio (e.g., a sound, music, or the like) to the external apparatus under control of the controller 210.

The I/O unit 260 may include an HDMI port 261, an S/PDIF port 262, or a USB port 263. A structure and an operation of the I/O unit 260 may be variously implemented according to exemplary embodiments.

The display unit 270 may display video or text information (e.g., a song title or the like) under control of the controller 210. The display unit 270 may, for example, include a liquid crystal display (LCD) type, an organic light-emitting diode (OLED) type, a plasma display panel (PDP) type, or a vacuum fluorescent display (VFD) type. Displayable video and/or text information may be different according to display methods.

The display unit 270 may display a text, an icon, or a symbol (e.g., "▶" corresponding to playing or "■" corresponding to pausing) corresponding to an external apparatus (e.g., the display apparatus 100, a portable terminal, a memory card, or the remote control 50) that is wirelessly connected to the audio apparatus 200 under control of the controller 210.

If a USB memory (not shown) that is one of memory cards is connected to the audio apparatus 200 through the USB port 263, the display unit 270 may display a text "USB ready" or playable "music name" under control of the controller 210.

If the display apparatus 100 or a portable phone (not shown) is connected to the audio apparatus 200 through a short range communication, the display unit 270 may display a text "BT connected" or "NFC connected" under control of the controller 210.

If the light receiver 250 of the audio apparatus 200 receives the light signal from the remote control 50, the display unit 270 may display a text, an icon, or a symbol corresponding to "power on" for turning on the audio apparatus 200, "power off" for turning off the audio apparatus 200, or "Vol±" indicating a controlled volume under control of the controller 210.

The text, the icon, or the symbol displayed on the display unit 270 may be moved toward one side direction under control of the controller 210. The text, the icon, or the symbol displayed on the display unit 270 may also flicker and be moved toward the one side direction under control of the controller 210.

If the audio apparatus 200 is turned off or on, the display unit 270 may display a visual feedback (e.g., a text, an icon, or a symbol) corresponding to a power supply under control of the controller 210.

The display unit 270 according to an exemplary embodiment may output a visual feedback corresponding to an event (e.g., a status change such as power on, power off, "portable terminal connection" or the like) of the audio apparatus 200 under control of the controller 210 of the audio apparatus 200.

The speaker 275 outputs the received audio under control of the controller 210. The speaker 275 may output an audio (e.g., a voice, music, a sound, or the like) that is received through the communicator 230 or the I/O unit 260. The speaker 275 may be implemented as 1 channel, 2 channels, or 2.1 channels. The speaker 275 may be implemented as 4 channels, 4.1 channels, 5.1 channels, 6.1 channels, 7.1 channels, 9.1 channels, or 11.2 channels but is not limited thereto.

The controller 210 may up-mix a received audio (e.g., 2.0 channels) and output the up-mixed audio to a 4-channel, 5-channel, 5.1-channel, or 7.1-channel speaker (e.g., an internal speaker or an additional speaker). The controller 210 may down-mix a received audio (e.g. 7.1 channels) and output the down-mixed audio to a 2-channel, 2.1-channel, or 5.1-channel speaker (e.g., an internal speaker). The controller 210 may output the received audio in consideration of the number of speakers 275 and the number of additional speakers corresponding to the audio. For example, if the number of speakers corresponding to the received audio is 5.1 channels, the controller 210 may output the audio through 5.1 channels in consideration of the speaker 275 (e.g., 2.1 channels) of the display apparatus 100 and an additional speaker (e.g., 3 channels) that are removed.

The controller 210 may provide various types of audio output effects (e.g., a concert hall, an orchestra hall, etc.) to the user in response to the number of speakers 275. The controller 210 may provide various types of audio output effects (e.g., a concert hall, an orchestra hall, etc.) to the user in response to the total number of additional speakers that are connected through the speaker 275 and the I/O unit 260.

The speaker 275 may output an audio stored in the storage unit 280 under control of the controller 210. The audio apparatus 200 may output an audio to an external apparatus (not shown) through the I/O unit 260. For example, the controller 210 may output an audio to an additional speaker or the display apparatus 100.

The speaker 275 according to an exemplary embodiment may output an auditory feedback corresponding to an event (e.g., a status change such as power on, power off, "portable terminal connection", or the like) of the audio apparatus 200 under control of the controller 210 of the audio apparatus 200. The speaker 275 may also output an auditory feedback corresponding to a text, an icon, or a symbol displayed on the display unit 270 under control of the controller 210 of the audio apparatus 200.

The storage unit 280 may store various types of data and control programs for driving and controlling the audio apparatus 200 under control of the controller 210. The storage unit 280 may store input and/or output signals or data corresponding to driving of the communicator 230, the light receiver 250, the I/O unit 260, the display unit 270, the speaker 275, and the power unit 290.

The storage unit 280 may include a nonvolatile memory, a volatile memory, an HDD, or an SDD.

The storage unit 280 may store a profile of the display apparatus 100 corresponding to power on and/or off of the audio apparatus 200.

The storage unit 280 may store a profile of the display apparatus 100 corresponding to audio streaming performed with respect to the audio apparatus 200.

The storage unit 280 may store a packet corresponding to an inquiry into the display apparatus 100.

The storage unit 280 may store a packet corresponding to a connection request of the display apparatus 100.

The storage unit 280 may store an image, a symbol, and/or a text displayed on the display unit 270.

The storage unit 280 may store a moving picture or an image corresponding to a visual feedback.

The storage unit 280 may store a sound corresponding to an auditory feedback.

The power unit 290 supplies the elements 230 through 280 of the audio apparatus 200 with power, which is input from an external power source, under control of the controller 210. The power unit 290 may supply the elements 230 through 280 with power, which is output from one battery (not shown) or two or more batteries (not shown) positioned inside the audio apparatus 200, under control of the controller 210.

The elements 230 through 280 of the audio apparatus 200 shown in FIGS. 1 and 2 may be removed or at least one element may be added according to a performance of the audio apparatus 200. The elements 230 through 280 may be changed according to the performance or a structure of the audio apparatus 200.

Figure 3:
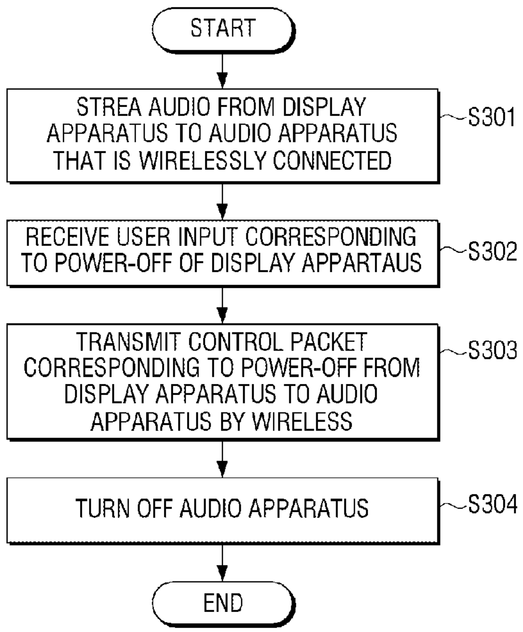
FIG. 3 is a schematic flowchart illustrating a method of controlling a power supply to an audio apparatus through a display apparatus according to an exemplary embodiment.

FIG. 3 is a schematic flowchart illustrating a method of controlling a power supply to an audio apparatus through a display apparatus, according to an exemplary embodiment.

Figure 5A:
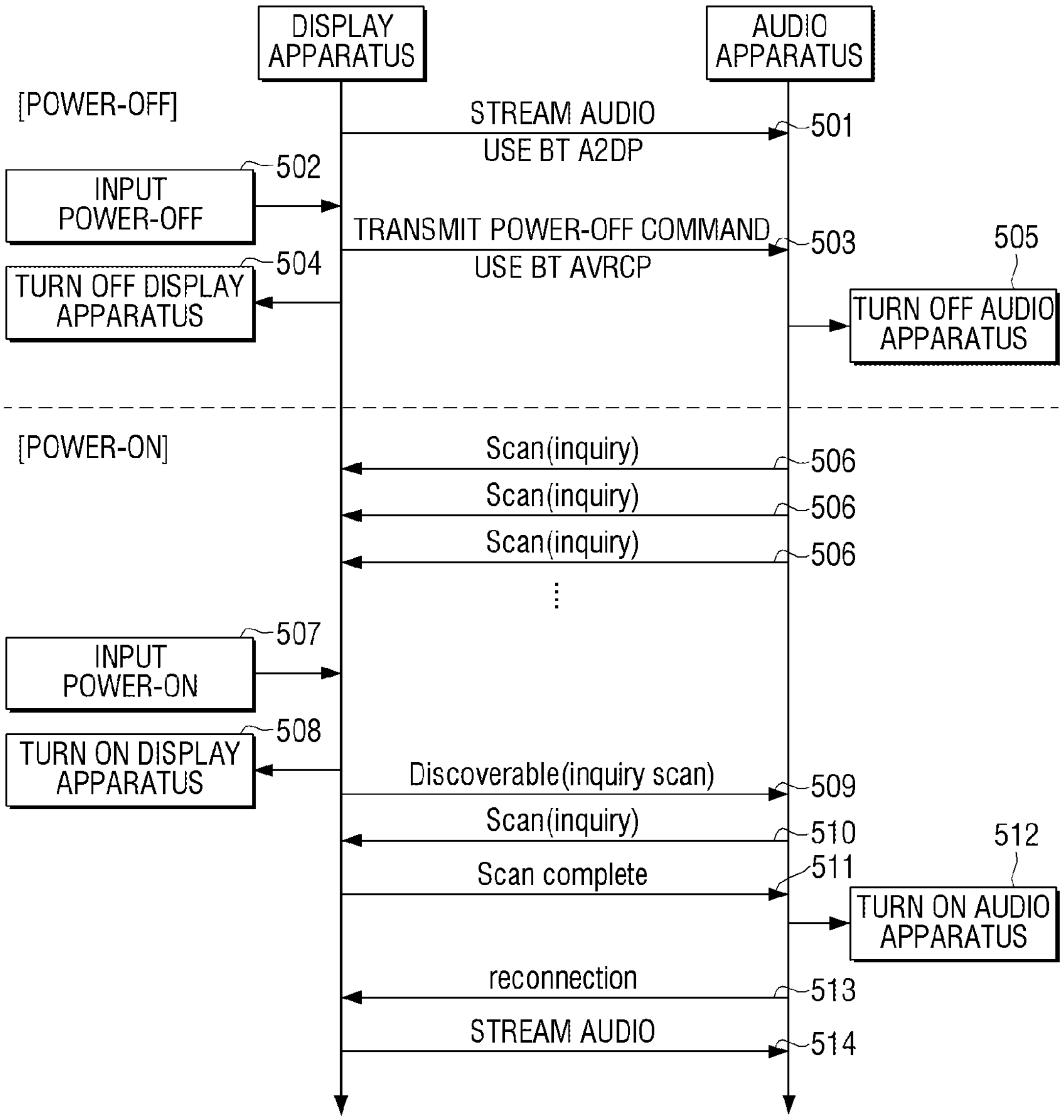
FIG. 5A is a schematic sequence diagram illustrating a method of controlling a power supply to an audio apparatus through a display apparatus according to an exemplary embodiment.

FIG. 5A is a schematic sequence diagram illustrating a method of controlling a power supply to an audio apparatus through a display apparatus, according to an exemplary embodiment.

Figure 5B:
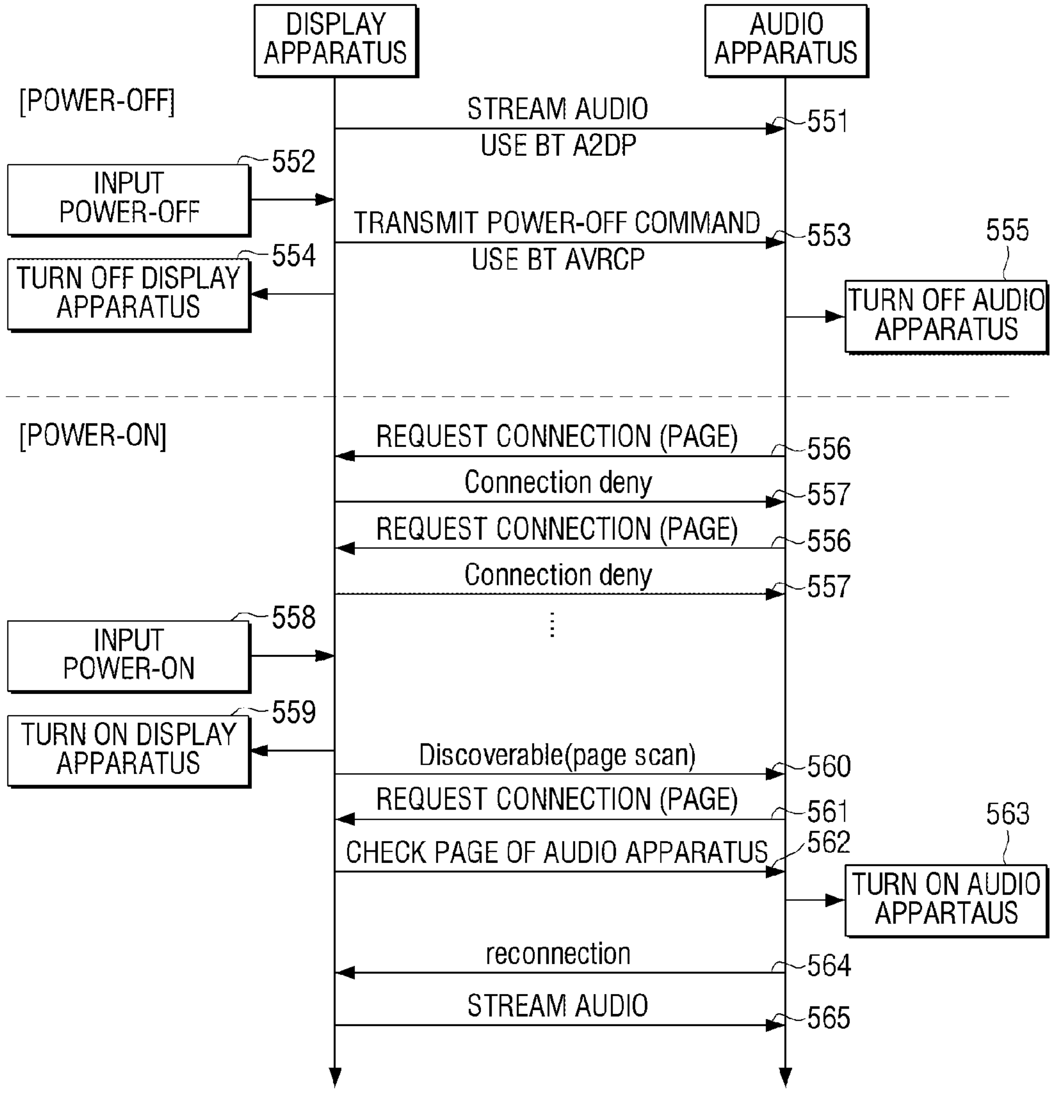
FIG. 5B is a schematic sequence diagram illustrating a method of controlling a power supply to an audio apparatus through a display apparatus according to another exemplary embodiment.

FIG. 5B is a schematic sequence diagram illustrating a method of controlling a power supply to an audio apparatus through a display apparatus, according to another exemplary embodiment.

FIGS. 6A through 7C are views illustrating a method of controlling a power supply to an audio apparatus through a display apparatus, according to an exemplary embodiment.

Figure 8A:
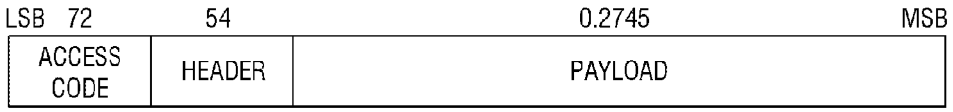
FIGS. 8A and 8B are schematic views illustrating a Bluetooth packet format according to an exemplary embodiment.
Figure 8B:
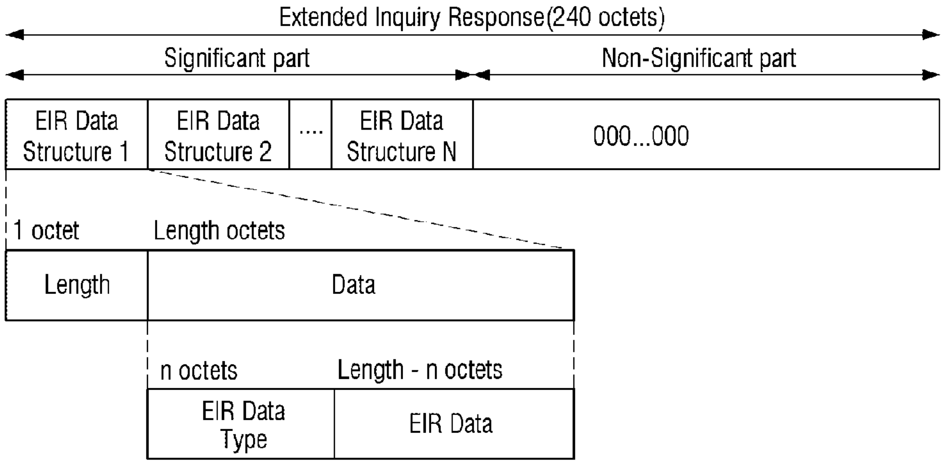

FIGS. 8A and 8B are schematic views illustrating a Bluetooth packet format according to an exemplary embodiment.

FIG. 9 is a view illustrating discoveries of a display apparatus and an audio apparatus according to an exemplary embodiment.

In operation S301 of FIG. 3, a display apparatus streams an audio to an audio apparatus that is wirelessly connected to the display apparatus.

Figure 6A:
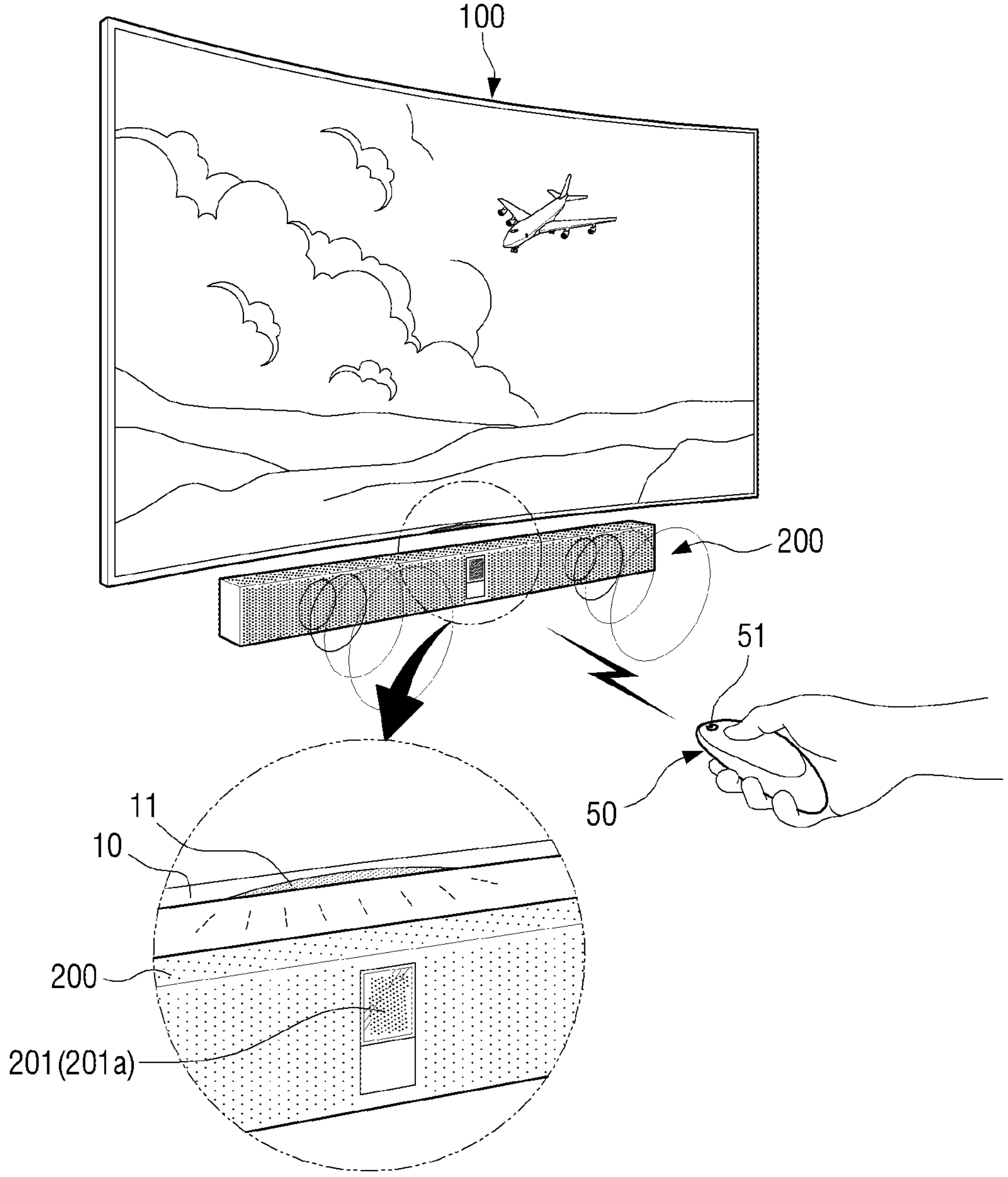
FIGS. 6A through 7C are views illustrating a method of controlling a power supply to an audio apparatus through a display apparatus according to various exemplary embodiments.
Figure 6B:
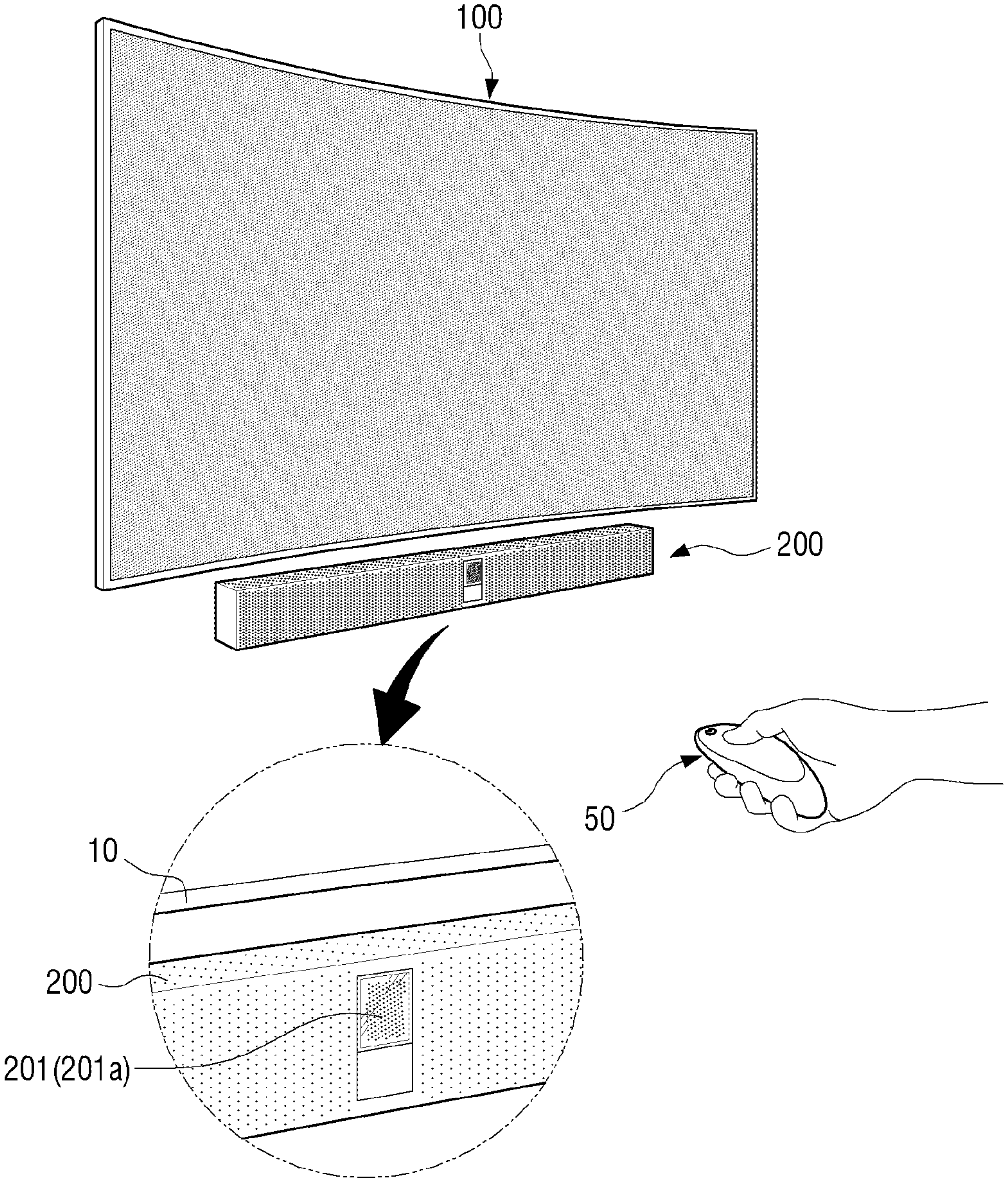

Referring to FIGS. 5A, 5B, and 6B, the display apparatus 100 streams an audio to the audio apparatus 200, which is connected to the display apparatus 100 by wireless (e.g., Bluetooth), in operations 501 and 551. The display apparatus 100 is fixed onto a wall by a mount unit (not shown) (supporting the display apparatus 100 on a stand under the display apparatus 100) and wirelessly outputs the audio to the audio apparatus 200 through the communicator 130.

The controller 110 of the display apparatus 100 may output a high-quality audio by using an Advanced Audio Distribution Profile (A2DP) of Bluetooth.

For example the A2DP profile or packet may include information on the source device, information on the sink device. The A2DP profile may also include information on an audio/video distribution transport protocol (AVDP) and information on a session description protocol (SDP). The A2DP profile may further include information on Baseband (e.g., information that specifies or implements the medium access and physical layer procedures between devices), information about a link manager protocol (LMP), and information about a logical link control and adaptation protocol (L2CAP).

Referring to FIG. 8A, a Bluetooth packet includes an access code of 72 bits for determining whether a packet is valid, a header of 54 bits, and a payload between 0 bit and 2,745 bits. The access code is used to determine the validity of the packet. The header includes a media access control address and a packet type. The payload includes transmitted data, and a size of the payload is changed according to a type of a transmitted packet. A transmitted high-quality audio is included in the payload of the packet.

The controller 110 of the display apparatus 100 may output audio data to the audio apparatus 200 by using the A2DP and another Bluetooth profile. A wireless connection may be established, for example, by using Bluetooth 132 or a short range communication.

The audio apparatus 200 outputs an audio, which is received from the display apparatus 100, through the speaker 275. The display apparatus 100 may also output the audio through the speaker 176.

The audio apparatus 200 may be fixed onto the wall. The audio apparatus 200 may also be positioned on a table (not shown) or a rack (not shown) positioned under the display apparatus 100.

The indicator 11 that is positioned in a central area of the bezel 10 of the display apparatus 100 emits light in one of color, white, and gray.

Light output from an illumination source (not shown) of the audio apparatus 200 is output to an outside through the display window 201. The indicator 11 may be positioned on a side (e.g., on a left area or a right area) based on the central area of the bezel 10 of the display apparatus 100. An indicator 201*a* of the audio apparatus 200 may emit light in color, white, gray, or another color. The audio apparatus 200 may select one of the display window 201 and the indicator 201*a* according to a function and a structure of the audio apparatus 200.

If the display apparatus 100 and the audio apparatus 200 are connected to each other through Bluetooth, the controller 210 of the audio apparatus 200 may display a text (e.g. "BT connected"), an image, or a symbol corresponding to a Bluetooth connection on the display unit 270.

In operation S302 of FIG. 3, the display apparatus receives a user input corresponding to a power off operation.

Referring to FIGS. 5A, 5B, and 6A, the display apparatus 100 receives a user input for turning off the display apparatus 100 in operations 502 and 552. The user input corresponding to the power off of the display apparatus 100 may include a user input performed by using the remote control 50 or a user input performed by using a power key of the panel key (not shown) that is positioned on the side or the back surface of the display apparatus 100, a user voice that may be received through the microphone 140, a user motion that may be detected by the camera unit 150, or a remote control that is performed by an installed application (e.g. a remote control application) of an external apparatus (e.g., a smartphone).

If a power key 51 is selected from the remote control 50 by a user that is one of a plurality of user inputs, a processor (not shown) of the remote control 50 may output a first control signal (e.g., corresponding to power off of the display apparatus 100) to the display apparatus 100 by using a communicator (not shown) or a light output unit (not shown).

According to an exemplary embodiment, "Selection of key" may be used as a term meaning pressing, touching, or contacting of a key for a preset time. The preset time may, for example, be 200 ms (which may be changed through setting).

The controller 110 of the display apparatus 100 may turn off the display apparatus 100 in response to the first control signal received through the communicator 130 or the light receiver 150. The controller 110 may also display a text, an icon, or a symbol corresponding to power off on a screen of the display apparatus 100 for a preset time (e.g., 800 ms which may be changed through setting).

In operation S303 of FIG. 3, the display apparatus transmits a control packet corresponding to the power off command to the audio apparatus by wireless.

Referring to FIGS. 5A, 5B, 8A, and 9, the controller 110 of the display apparatus 100 transmits a control command (e.g., a control packet) corresponding to the received power off command to the audio apparatus 200 through the communicator 130, separately from audio streaming in operations 503 and 553. For example, the control command may include a power command 0X40.

The controller 110 of the display apparatus 100 may transmit a control command (e.g., a control packet) having a format, which is defined by an Audio Video Remote Control Profile (AVRCP) of Bluetooth, to the audio apparatus 200. The controller 110 of the display apparatus 100 may control the audio apparatus 200 by using the control command. The control command may, for example, include power on and/or off, volume up and/or down, a menu, playing, pausing, stopping, rewarding, or forwarding. The control command is included in the payload of the packet.

The AVRCP format may include information about a controller (i.e., the remote control device initiating or sending a command) and information about a target device (e.g., a target device that is being controlled, for example, the audio apparatus). The AVRCP format may also include information on Baseband (e.g., information that specifies or implements the medium access and physical layer procedures between devices), information about a link manager protocol (LMP), and information about a logical link control and adaptation protocol (L2CAP). The AVRCP may further include information on a protocol used for controlling consumer audio/video (e.g., AV/C Digital Interface Command Set) as well as information on an Audio/Video Control Transport Protocol (AVCTP).

The storage unit 180 may store information about whether the control command is transmitted or a transmission period of the control command under control of the controller 110.

Referring to FIG. 6B, if the display apparatus 100 transmits the control command to the audio apparatus 200, the controller 110 of the display apparatus 100 turns off the display apparatus 100 in operations 504 and 554. If the display apparatus 100 receives a response to a reception of the control command transmitted from the display apparatus 100, the controller 110 of the display apparatus 100 turns off the display apparatus 100 in operations 504 and 554. The display apparatus 100 is turned off, but the audio apparatus 200 is turned on.

The controller 110 of the display apparatus 100 may repeatedly (e.g., at intervals of 625 ms) transmit the control command for turning off the audio apparatus 200 within a preset time (e.g., 5 sec which may be changed through setting). If the repeated transmission of the control command within the preset time is completed, the controller 110 of the display apparatus 100 may turn off the display apparatus 100. The display apparatus 100 is turned off, but the audio apparatus 200 is turned on.

In operation S304 of FIG. 3, the audio apparatus is turned off.

Figure 6C:
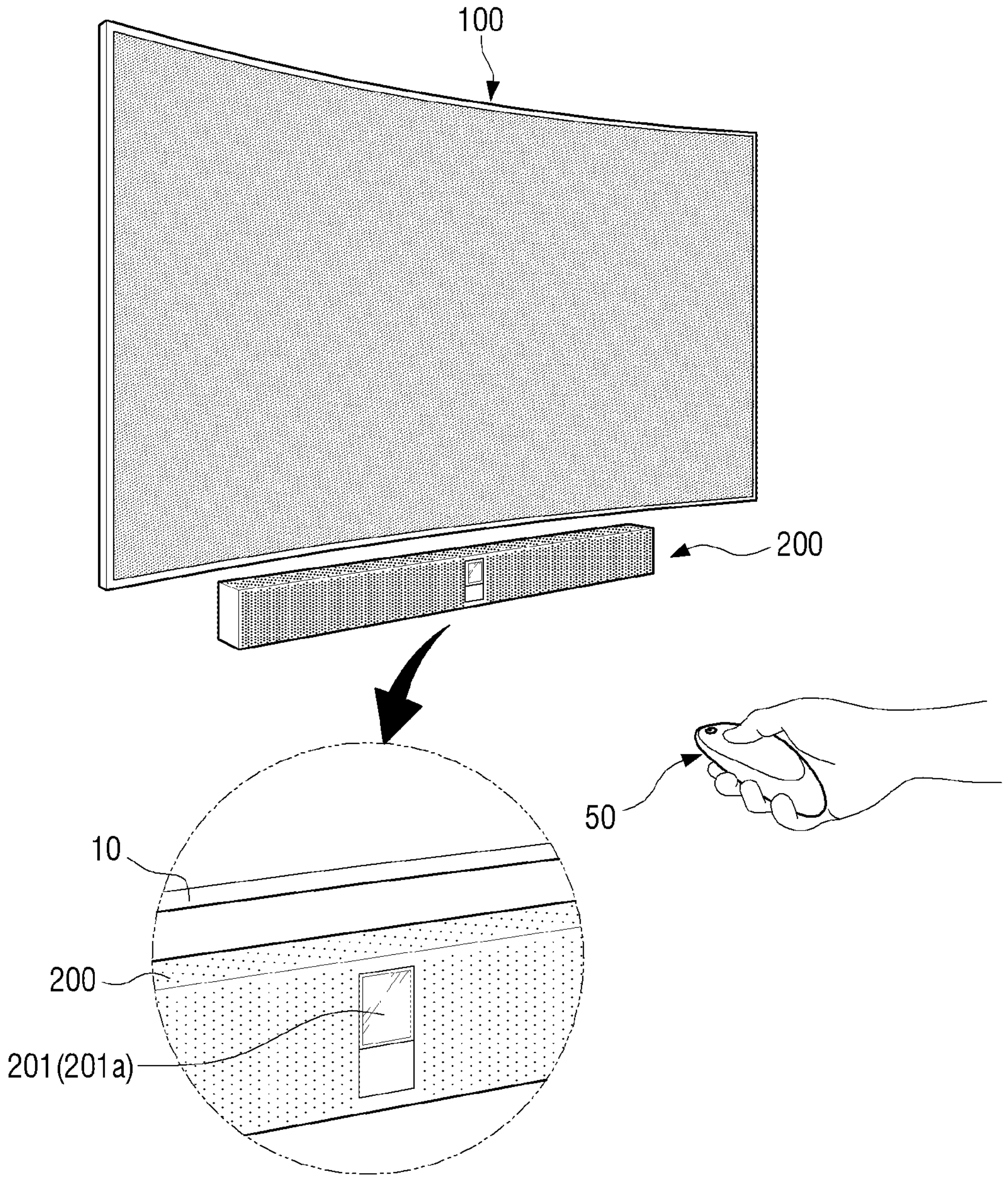

Referring to FIGS. 5A, 5B, and 6C, the audio apparatus 200 is turned off in response to the received control command in operations 505 and 555. The controller 210 of the audio apparatus 200 may interpret the control command that is received through the communicator 230. The controller 210 of the audio apparatus 200 may turn off the audio apparatus 200 in response to the received control command.

The controller 210 may also check whether the audio is received from the display apparatus 100 through the communicator 230. For example, if the display apparatus 100 is turned off, the controller 110 of the display apparatus 100 may stop transmitting audio for audio streaming. If the display apparatus 100 is turned off, the controller 110 of the display apparatus 100 may transmit one of the control command and the control packet corresponding to the transmission of the audio for audio streaming to the audio apparatus 200. The controller 210 of the audio apparatus 200 may end outputting of the audio, which is received from the display apparatus 100, through the speaker 275 before the audio apparatus 200 is turned off.

The storage unit 280 may store the received control command under control of the controller 210 of the audio apparatus 200. The storage unit 280 may also store the interpreted control command under control of the controller 210 of the audio apparatus 200.

If the audio apparatus 200 is turned off, the method of controlling the power supply to the audio apparatus 200 through the display apparatus 100 ends.

Figure 4:
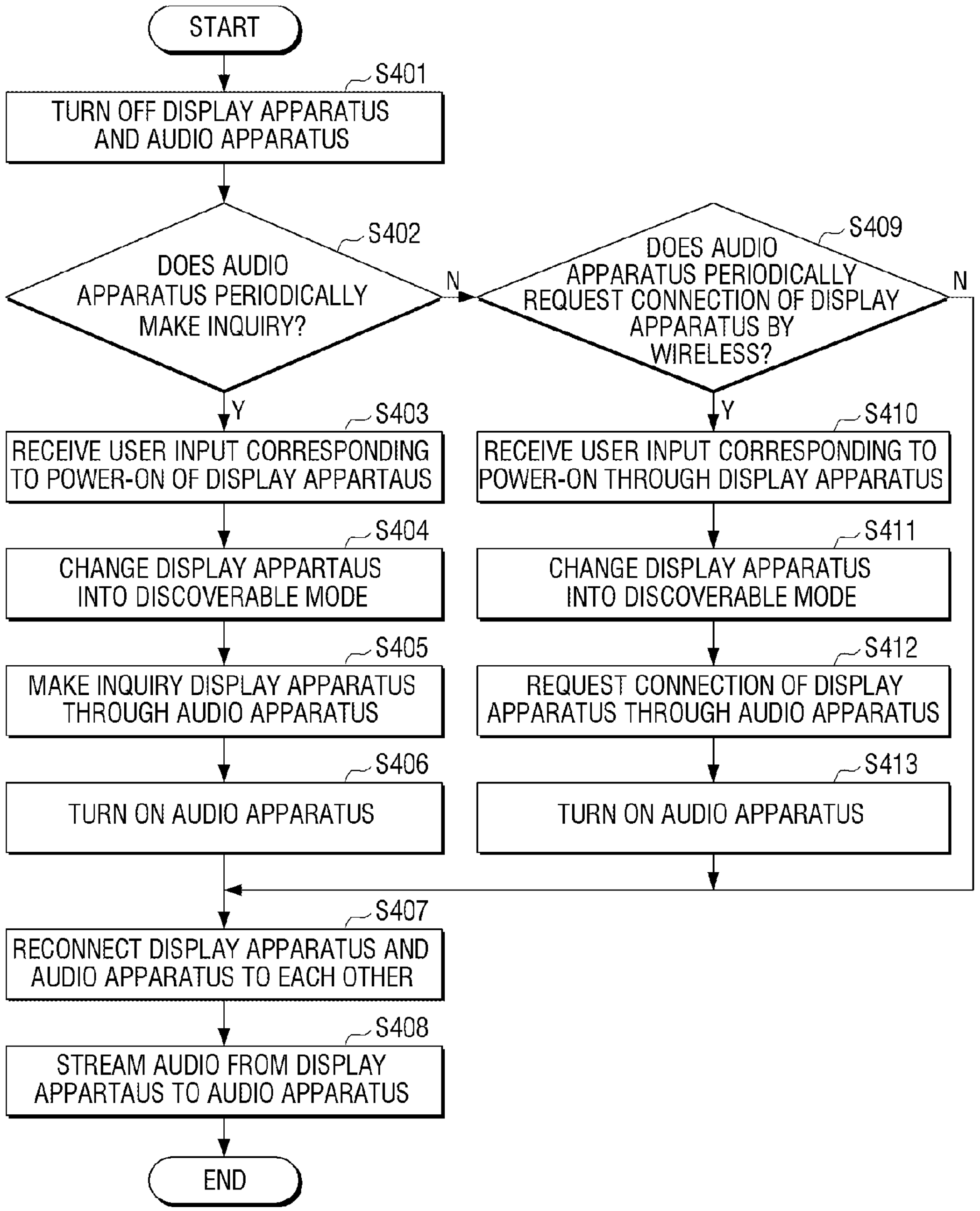
FIG. 4 is a schematic flowchart illustrating a method of controlling a power supply to an audio apparatus through a display apparatus according to another exemplary embodiment.

FIG. 4 is a schematic flowchart illustrating a method of controlling a power supply to an audio apparatus through a display apparatus, according to another exemplary embodiment.

In operation S401 of FIG. 4, the display apparatus and the audio apparatus are all turned off.

Figure 7A:
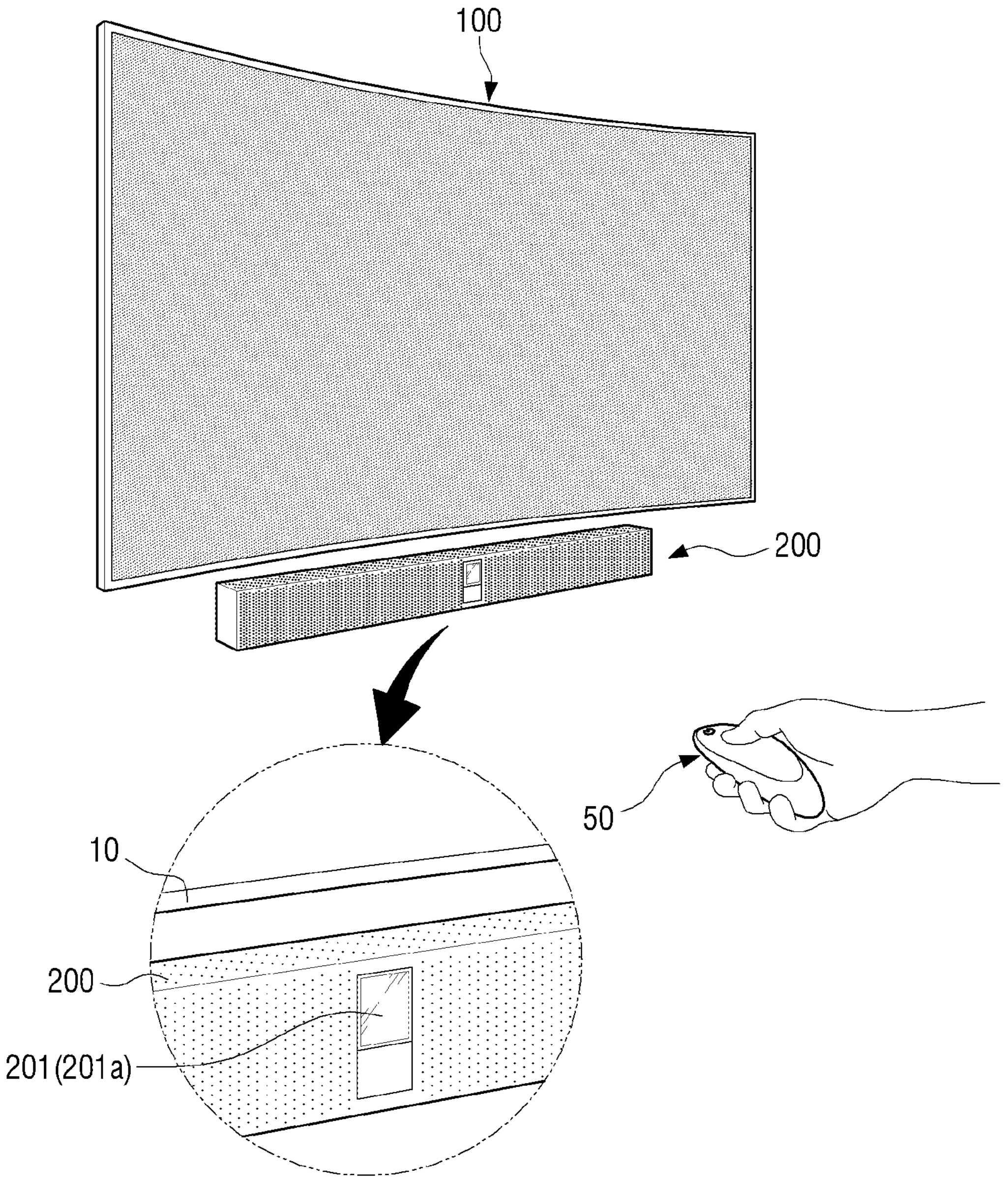

Referring to FIGS. 5A, 5B, and 7A, the display apparatus 100 and the audio apparatus 200 are all turned off. The indicator 11 of the display apparatus 100 is turned off. The display window 201 or the indicator 201*a* of the audio apparatus 200 is also turned off.

In operation S402 of FIG. 4, the audio apparatus periodically makes an inquiry.

Referring to FIGS. 5A and FIG. 9, the controller 210 of the audio apparatus 200, which is turned off, periodically makes an inquiry to detect the display apparatus 100 in operation 506. The audio apparatus 200 may make the inquiry at intervals of 1.28 s. The inquiry intervals of the audio apparatus 200 may include inquiries made at intervals of 2.56 s.

The audio apparatus 200 may not supply power to other elements (e.g., the display unit 270 and the speaker 275) except elements for periodical scanning.

The other elements that are not supplied with the power may be changed according to a function and a structure of the audio apparatus 200. For example, the speaker 270 may be supplied with power and display unit 270 may not be supplied with power or the speaker 270 may not be supplied with power and display unit 270 may be supplied with power.

If the audio apparatus 200 does not periodically make the inquiry in operation S402-N of FIG. 4, the methods goes to operation S409 of FIG. 4.

In operation S403 of FIG. 4, the display apparatus receives a user input corresponding to power on.

Referring to FIGS. 5A and 7, the display apparatus 100 receives a user input for turning on the display apparatus 100 in operation 507. The user input corresponding to the power on of the display apparatus may, for example, include a user input performed by using the remote control 50 or a user input performed by using the power key (not shown) of the panel key that is positioned on the side or the back surface of the display apparatus 100, a user voice that may be received through the microphone 140, a user motion that may be detected by the camera unit 145, or a remote control performed by the installed application (e.g., a remote control application) of an external apparatus (e.g., a smartphone).

If the power key 51 is selected from the remote control 50 by a user that is one of a plurality of user inputs, the processor of the remote control 50 may output a second control signal (e.g., corresponding to the power on of the display apparatus 100) to the display apparatus 100 by using the communicator or the light output unit.

In operation 508, the controller 110 of the display apparatus 100 turns on the display apparatus 100 in response to the second control signal received through the communicator 130 or the light receiver 150. The controller 110 may also display a text, an icon, or a symbol corresponding to the power on the screen of the display apparatus 100 for a preset time (e.g., 500 ms, which may be changed through setting).

In operation S404 of FIG. 4, the display apparatus is changed into a discoverable mode.

Figure 7B:
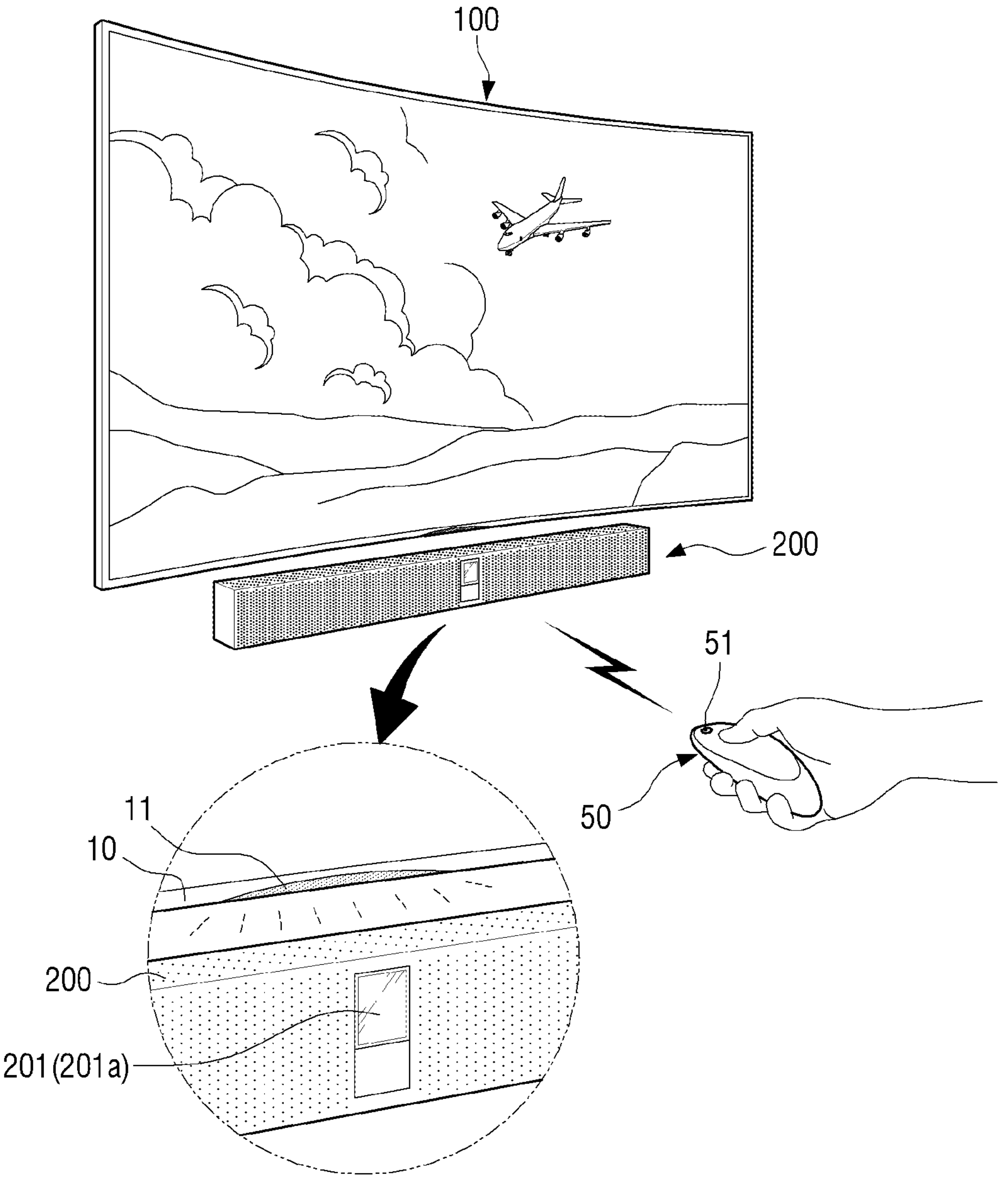

Referring to FIGS. 5A and 7B, the controller 110 of the display apparatus 100 is changed into the discoverable mode so as to enable the audio apparatus 200 to make an inquiry in operation 509. The display apparatus 100 that is in the discoverable mode may receive the inquiry of the audio apparatus 200. The storage unit 180 may store information about whether the display apparatus 100 is changeable into the discoverable mode under control of the controller 110. The discoverable mode may mean that the display apparatus 100 may respond to an inquiry or a call for Bluetooth discovery and/or connection. The controller 110 of the display apparatus 100 may perform an inquiry scan in response to the inquiry of the audio apparatus 200.

If the display apparatus 100 is turned on, the indicator 11 positioned in the central area of the bezel 100 of the display apparatus 100 may emit light in one of color, white, and gray. The audio apparatus 200 may also be turned off.

In operation S405 of FIG. 4, the audio apparatus inquires the display apparatus.

Referring to FIGS. 5A, 7B, and 8B, the controller 210 of the audio apparatus 200 that is turned off periodically makes an inquiry to discover the display apparatus 100 by using the communicator 230 in operation 510. The periodical inquiry in operations 506 and 510 may be performed in the audio apparatus 200 separately from a status change of the display apparatus 100 in operations 507 through 509.

In operation 511, the controller 110 of the display apparatus 100 respond to the inquiry of the audio apparatus 200.

Referring to FIG. 8B, an extended inquire response (EIR) packet that is defined by a Bluetooth profile includes a significant part indicating consecutive data structures and a non-significant part indicating all-zero octets. The significant part includes EIR Data Structure 1, EIR Data Structure 2, . . . , and EIR Data Structure N. Parameters that are included in EIR data may include "num_response" indicating the number of source apparatuses responding to a scan of an audio apparatus, "BD ADDR" indicating an address of a source apparatus (e.g. a display apparatus) that responds to the scan of the audio apparatus, and "reserved" indicating a class or a reserved bit of the source apparatus.

In operation S406 of FIG. 4, the audio apparatus is turned on.

Figure 7C:
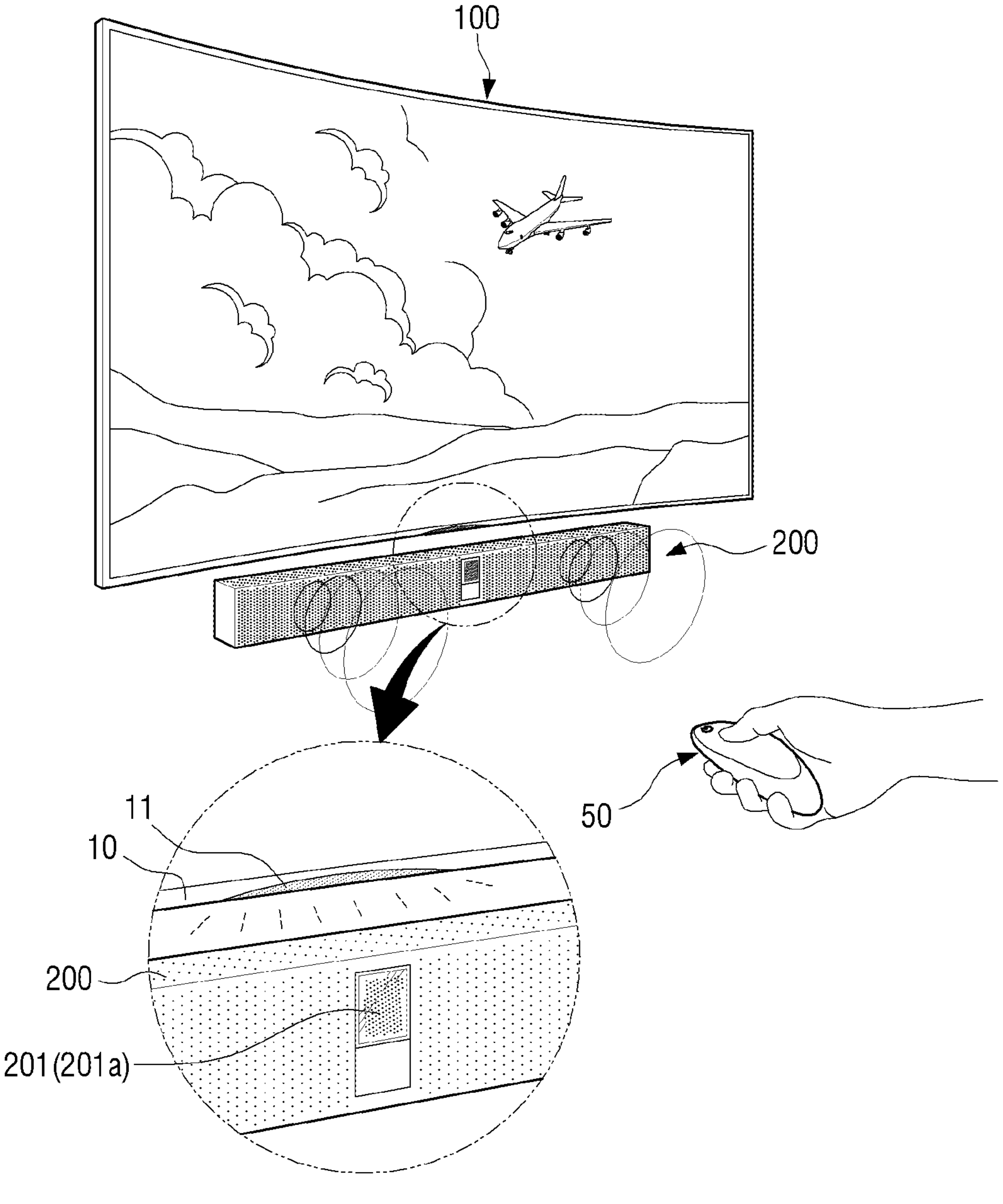

Referring to FIGS. 5A and 7C, the controller 210 of the audio apparatus 200 may determine whether the display apparatus 100 and the audio apparatus 200 are pre-connected to each other, by using "BD ADDR" that is one of the parameters included in a received inquiry response. If there is a history of the pre-connection between the display apparatus 100 and the audio apparatus 200, the controller 210 of the audio apparatus 200 turns on the audio apparatus 200 without a user input in operation 512.

When the audio apparatus 200 is turned on, light output from the illumination source of the audio apparatus 200 is output to an outside through the display window 201. The indicator 201*a* of the audio apparatus 200 may emit light in color, white, or gray.

In operation S407 of FIG. 4, the display apparatus and the audio apparatus are reconnected to each other.

Referring to FIGS. 5A and 7C, the display apparatus 100 and the audio apparatus 200 that are respectively supplied with powers are reconnected to each other in operation 513. The controller 110 of the display apparatus 100 and the controller 210 of the audio apparatus 200 may be reconnected to each other through the communicators 130 and 230. The controller 110 of the display apparatus 100 and the controller 210 of the audio apparatus 200 may be reconnected to each other by using the stored history information.

The storage units 180 and 280 may each store history information corresponding to the reconnection under the respective controls of the controllers 110 and 210. The history information may include information (e.g., including apparatus names, apparatus addresses, apparatus types, apparatus classes, etc. which may be changed) about connected apparatuses (e.g., a display apparatus and an audio apparatus), the number of times apparatuses being accessed, connection start times, connection end times, reconnection times, or the like.

In operation S408 of FIG. 4, the display apparatus streams an audio to the audio apparatus that is wirelessly connected thereto.

Referring to FIG. 5A, the display apparatus 100 streams an audio to the audio apparatus 200 in operation 514. The display apparatus 100 may stream the audio to the audio apparatus 200 that is automatically set to a Bluetooth mode. The controller 110 of the display apparatus 100 may output a high-quality audio to the audio apparatus 200 by using an A2DP of Bluetooth.

In FIGS. 4 and 5A, audio streaming 514 of the display apparatus 100 performed in operation S408 of FIG. 4 is substantially similar (e.g., reconnection) to audio streaming 501 of the display apparatus 100 performed in operation S401 of FIG. 4, and thus their repeated descriptions are omitted.

If the display apparatus streams the audio to the audio apparatus in operation S408 of FIG. 4, the method of controlling the power supply to the audio apparatus through the display apparatus ends.

If the audio apparatus does not periodically make the inquiry in operation S402 of FIG. 2, the method goes to operation S409 of FIG. 4.

In operation S409 of FIG. 4, the audio apparatus periodically requests a connection of the display apparatus.

Referring to FIG. 5B, the controller 210 of the audio apparatus 200 that is turned off periodically requests a connection to discover the display apparatus 100 by using the communicator 230 in operation 556. The controller 210 of the audio apparatus 200 may transmit an ID packet including an apparatus address (BDADDR) to the display apparatus 100 to request the connection. The audio apparatus 200 may request the connection at intervals of 1.28 s. The inquiry intervals may include consecutive connection requests or connection requests of intervals of 2.56 s. The audio apparatus 200 may not supply power to other elements (e.g., the display unit 270 and the speaker 275) except elements of periodical scanning.

The other elements that are not supplied with the power may be changed according to the function and the structure of the audio apparatus 200.

If the display apparatus 100 receives the connection inquiry in operation 556, the display apparatus 100 that is turned off denies the connection request in operation 557. The connection request of the audio apparatus 200 and the denial of the display apparatus 100 of the connection request may continue until the display apparatus 100 is turned on.

In operation S410 of FIG. 4, the display apparatus receives a user input corresponding to power on.

Referring to FIGS. 5B and 7, the display apparatus 100 receives a user input for turning on the display apparatus 100 in operation 558. The user input corresponding to the power on of the display apparatus may include a user input performed by using the remote control 50 or a user input performed by the power key of the panel key that is positioned on the side or the back surface of the display apparatus 100, a user voice that may be received through the microphone 140, a user motion that may be detected by the camera unit 150, or a remote control performed by an installed application (e.g., a remote control application) of an external apparatus (e.g., a smartphone).

The controller 110 of the display apparatus 100 turns on the display apparatus 100 in response to the second control signal received through the communicator 130 or the light receiver 150 in operation 559.

Operation S410 of FIG. 4 is substantially similar to operation S403 of FIG. 4, and thus repeated descriptions are omitted.

In operation S411 of FIG. 4, the display apparatus changes into the discoverable mode.

Referring to FIGS. 5B and 7B, the controller 110 of the display apparatus 100 changes the display apparatus 100 into the discoverable mode so as to enable the audio apparatus 200 to make a connection request in operation 560. The display apparatus 100 that is in the discoverable mode may receive the connection request of the audio apparatus 200. The storage unit 180 may store the change of the display apparatus 100 into the discoverable mode under control of the processor 100. The discoverable mode may mean a response to an inquiry or a connection request for Bluetooth discovery and/or connection.

When the display apparatus 100 is turned on, the indicator 11 positioned in the central area of the bezel 10 of the display apparatus 100 may emit light in one of color, white, and gray. The audio apparatus 200 may also be turned off.

In operation S412 of FIG. 4, the audio apparatus requests a connection of the display apparatus.

Referring to FIGS. 5B and 7B, the controller 210 of the audio apparatus 200 that is turned off may request a connection of the display apparatus 100 by using the communicator 230 in operation 561. The connection request in operation S412 of FIG. 4 is substantially similar (e.g., an ID packet including an apparatus address) to operation S409.

The controller 110 of the display apparatus 100 responds to the connection request of the audio apparatus 200 in operation 562.

In operation S413 of FIG. 4, the audio apparatus is turned on.

Referring to FIGS. 5B and 7C, the controller 210 of the audio apparatus 200 may receive an ID packet included in a response to the received connection request. The controller 210 of the audio apparatus 200 turns on the audio apparatus 200 by using the received ID packet without a user input in operation 563.

When the audio apparatus 200 is turned on, light output from the illumination source of the audio apparatus 200 is output to an outside through the display window 201. The indicator 201*a* of the audio apparatus 200 may emit light in color, white, or gray.

In operation S407 of FIG. 4, the display apparatus and the audio apparatus are reconnected to each other.

Referring to FIGS. 5B and 7C, the display apparatus 100 and the audio apparatus 200 that are respectively supplied with powers are reconnected to each other in operation 564. For example, the display apparatus 100 and the audio apparatus 200 may be reconnected to each other by using a control command HCI_SET_EVENT_FILTER.

The display apparatus 100 and the audio apparatus 200 may be reconnected to each other by using the communicators 130 and 230 under control of the controllers 110 and 210. The storage units 180 and 280 may store history information corresponding to the reconnection under the respective control of the controllers 110 and 210. The history information may include information (e.g., apparatus names, apparatus addresses, apparatus types, apparatus classes, etc. which may be changed) about connected apparatuses (e.g., a display apparatus and au audio apparatus), connection start times, connection end times, reconnection times, or the like. The history information may also include a key or pin used to connect display apparatus and the audio apparatus.

In operation S408 of FIG. 4, the display apparatus streams the audio to the audio apparatus that is wirelessly connected thereto.

Referring to FIG. 5B, the display apparatus 100 streams the audio to the audio apparatus 200 in operation 565. The controller 110 of the display apparatus 100 may output a high-quality audio to the audio apparatus 200 by using an A2DP of Bluetooth.

In FIGS. 4 and 5A, audio streaming 514 of the display apparatus 100 in operation S408 of FIG. 4 is substantially similar (e.g., reconnection) to audio streaming 501 of the display apparatus 100 in operation S401 of FIG. 4, and repeated descriptions are omitted.

If the display apparatus streams the audio to the audio apparatus in operation S408 of FIG. 4, the method of controlling the power supply to the audio apparatus through the display apparatus ends.

In an electronic apparatus and an audio apparatus that are wirelessly connected to each other, there may be provided the electronic apparatus that turns on and/or off an external apparatus in response to power off and/or on, the external apparatus, and a method of controlling a power supply to the external apparatus through the electronic apparatus.

In an electronic apparatus and an audio apparatus that are connected to each other through Bluetooth, there may be provided the electronic apparatus that turns off and/or on the external apparatus in response to power off and/or on, the external apparatus, and a method of controlling a power supply to the external apparatus through the electronic apparatus.

In an electronic apparatus and an audio apparatus that are wirelessly connected to each other, if the electronic apparatus is turned off, there may be provided the electronic apparatus that turns off an external apparatus through a control packet transmitted to the external apparatus, the external apparatus, and a method of controlling a power supply to the external apparatus through the electronic apparatus.

In an electronic apparatus and an audio apparatus that are wirelessly connected to each other, if the electronic apparatus is turned off, there may be provided the electronic apparatus that automatically turns off the external apparatus through a control packet transmitted to the external apparatus, the external apparatus, and a method of controlling a power supply to the external apparatus through the electronic apparatus.

In an electronic apparatus and an audio apparatus that are wirelessly connected to each other, if the electronic apparatus is turned on, there may be provided the electronic apparatus that turns on the external apparatus through a control packet transmitted to the external apparatus, the external apparatus, and a method of controlling a power supply to the external apparatus through the electronic apparatus.

In an electronic apparatus and an audio apparatus that are wirelessly connected to each other, if the electronic apparatus is turned on, there may be provided the electronic apparatus that automatically turns on the external apparatus through a control packet transmitted to the external apparatus, the external apparatus, and a method of controlling a power supply to the external apparatus through the electronic apparatus.

According to various exemplary embodiments, in an electronic apparatus and an audio apparatus that are wirelessly connected to each other, there may be provided the electronic apparatus that turns off and/or on the external apparatus in response to power off and/or on of the electronic apparatus, the external apparatus, and a method of controlling a power supply to the external apparatus through the electronic apparatus.

Methods according to exemplary embodiments may be implemented as program commands, which may be executed through various types of computers, to be recorded on a computer-readable medium. The computer-readable medium may include a program command, a data file, a data structure, or combinations thereof. For example, the computer-readable medium may enable optical or magnetic recording like a volatile or nonvolatile storage device such as an ROM or the like, a memory such as an RAM, a memory chip, an apparatus, or integrated circuit (IC), a CD, DVD, a magnetic disc, a magnetic tape, or the like. The optical or magnetic recording may be stored on a machine (e.g. a computer)-readable storage medium.

A memory that may be included in a mobile terminal may be an example of a program including commands or a machine-readable storage medium appropriate for storing programs according to exemplary embodiments. A program command that is recorded on the medium may be particularly designed for an exemplary embodiment.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. An electronic apparatus comprising:

a transceiver configured to wirelessly connect to an external apparatus; and a processor configured to:

in response to a user input to turn off the electronic apparatus being received, control the transceiver to transmit a control command for turning off the external apparatus to the external apparatus, and then turn off the electronic apparatus, in response to a user input to turn on the electronic apparatus being received, control the transceiver to enter into a discoverable mode, and in response to an inquiry or a request for connection being received from the external apparatus, control the transceiver to transmit a response to the external apparatus.

2. The electronic apparatus of claim 1, further comprising:

at least one from among a light receiver configured to receive a control signal from a remote controller, a panel key that is positioned on one of a side and a back surface of the electronic apparatus, a microphone configured to receive a user voice, and a camera configured to receive a user motion, wherein the processor receives the input to turn off the electronic apparatus through the at least one of the light receiver, the panel key, the microphone, and the camera.

3. The electronic apparatus of claim 1, wherein the profile comprises an Audio Video Remote Control Profile (AVRCP).

4. The electronic apparatus of claim 1, further comprising:

an indicator configured to be turned on and/or off in response to the input to turn off the electronic apparatus, wherein the control command comprises a control packet which is generated according to a profile of a short range communication, and wherein the processor turns off the indicator in response to the control packet being transmitted to the external apparatus.

5. The electronic apparatus of claim 2, wherein the processor turns on the electronic apparatus and controls the transceiver to enter into the discoverable mode so as to enable the external apparatus to inquire the electronic apparatus in response to the user input to turn on the electronic apparatus being received through one of the light receiver, the panel key, the microphone, and the camera.

6. The electronic apparatus of claim 5, wherein the processor transmits an inquiry response to the external apparatus in response to an inquiry being received from the external apparatus, wherein the inquiry response comprises an Extended Inquiry Response (EIR) packet that is defined by a Bluetooth profile.

7. The electronic apparatus of claim 6, wherein the processor resumes a communication connection to the external apparatus and streams audio to the external apparatus in response to the external apparatus being turned on.

8. A method of controlling an electronic apparatus, the method comprising:

receiving a first user input for turning off the electronic apparatus that is wirelessly connected to an external apparatus;

transmitting a control command for turning off the external apparatus to the external apparatus in response to the first user input;

turning off the electronic apparatus;

changing the electronic apparatus into a discoverable mode in response to a user input to turn on the electronic apparatus being received; and transmitting a response to the external apparatus in response to an inquiry or a request for connection being received from the external apparatus.

9. The method of claim 8, wherein the control command comprises a control packet which is generated according to a Bluetooth profile, and wherein the control packet is repeatedly transmitted for a preset time.

10. The method of claim 8, wherein at least one selected from among a visual feedback and an auditory feedback is provided in response to the received first user input.

11. The method of claim 8, further comprising:

receiving a second user input for turning on the electronic apparatus that is turned off; and turning on the electronic apparatus in response to the second user input and transmitting an inquiry response for turning on the external apparatus to the external apparatus in response to a received inquiry of the external apparatus.

12. An audio apparatus comprising:

a transceiver configured to wirelessly connect to a display apparatus; and a processor configured to:

control to turn off the audio apparatus in response to the transceiver receiving the control command for turning off the audio apparatus, and control the transceiver to transmit an inquiry to the display apparatus or a request for connection to the display apparatus, wherein the control command comprises a control packet which is generated according to a Bluetooth profile.

13. The audio apparatus of claim 12, wherein the Bluetooth profile comprises an Audio Video Remote Control Profile (AVRCP).

14. The audio apparatus of claim 12, further comprising:

at least one indicator configured to turn on or turn off in response to a power on or a power off of the audio apparatus and a display window configured to transmit light of an illumination source that is turned on or turned off in response to the power on and the power off of the audio apparatus, wherein the processor turns off the at least one indicator and the illumination source after the display apparatus is turned off.

15. The audio apparatus of claim 12, wherein the processor controls to turn on the audio apparatus in response to a response to the inquiry or the request for connection being received from the display apparatus.

16. The audio apparatus of claim 12, further comprising:

a speaker configured to, in response to the display apparatus and the audio apparatus being turned on, output audio received from the display apparatus.

17. A method of controlling power of an audio apparatus that is wirelessly connected to a display apparatus, the method comprising:

receiving a control command for turning off the audio apparatus from the display apparatus in response to a user input to turn off the display apparatus, the user input being input from the display apparatus;

turning off the audio apparatus in response to the received control command; and transmitting an inquiry to the display apparatus or a request for a connection to the display apparatus, wherein the control command comprises a control packet which is generated according to a Bluetooth profile.

18. The method of claim 17, further comprising:

before turning off the audio apparatus, ending outputting of audio received from the display apparatus.

19. The method of claim 17, wherein at least one selected from among a visual feedback and an auditory feedback is provided in response to the turning off of the audio apparatus.

* * * * *